(12) United States Patent
Tanaka et al.

(10) Patent No.: US 11,366,308 B2
(45) Date of Patent: Jun. 21, 2022

(54) OPTICAL SCANNER UNIT AND OPTICAL DEVICE

(71) Applicant: Funai Electric Co., Ltd., Osaka (JP)

(72) Inventors: Fuminori Tanaka, Osaka (JP); Futoshi Takeda, Osaka (JP); Kenji Tanehashi, Osaka (JP); Kenichi Fujita, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 92 days.

(21) Appl. No.: 16/775,668

(22) Filed: Jan. 29, 2020

(65) Prior Publication Data

US 2020/0363632 A1    Nov. 19, 2020

(30) Foreign Application Priority Data

May 16, 2019  (JP) ............................... JP2019-92866

(51) Int. Cl.
    *G02B 26/08*    (2006.01)
    *G01J 1/04*     (2006.01)
    (Continued)

(52) U.S. Cl.
    CPC ........ *G02B 26/0858* (2013.01); *G01J 1/0414* (2013.01); *G01J 1/44* (2013.01); *G02B 26/10* (2013.01); *G01J 2001/4473* (2013.01)

(58) Field of Classification Search
    CPC .. G02B 26/0858; G02B 26/10; G02B 26/105; G01J 1/0414; G01J 1/44; G01J 2001/4473; G01B 11/26
    See application file for complete search history.

(56) References Cited

U.S. PATENT DOCUMENTS 5,844,673 A * 12/1998 Ivers ................. G01D 5/34715
                                                356/138
7,031,040 B2 * 4/2006 Fujii ................. G02B 26/0841
                                                310/309
(Continued)

FOREIGN PATENT DOCUMENTS

CN       102679910 A      9/2012
EP       3 418 057 A1    12/2018
                (Continued)

OTHER PUBLICATIONS

The extended European search report for the corresponding European application No. 20166645.0, dated Oct. 12, 2020.

*Primary Examiner* — Seung C Sohn
(74) *Attorney, Agent, or Firm* — Global IP Counselors, LLP

(57) ABSTRACT

An optical scanner unit includes a mirror component, a vibration generator, an optical sensor, and a light shield portion. The mirror component includes a reflective portion for reflecting light. The vibration generator swings the mirror component around a specific swing axis when AC voltage is applied. The optical sensor includes a light emitter and a light receiver for receiving light emitted from the light emitter. The light shield portion is provided to the mirror component so as to swing along with the mirror component. The light shield portion blocks the light emitted from the light emitter. The light receiver further includes a first light receiver that is provided on one swing angle side from a center position of a swing angle range of the light shield portion, and a second light receiver that is provided on the other swing angle side from the center position of the swing angle range.

19 Claims, 16 Drawing Sheets

[FIRST EMBODIMENT]

(51) Int. Cl.
*G01J 1/44* (2006.01)
*G02B 26/10* (2006.01)

(56) References Cited

U.S. PATENT DOCUMENTS

| | | | |
|---|---|---|---|
| 7,688,432 B1 | 3/2010 | Benner, Jr. | |
| 7,909,951 B2 * | 3/2011 | Shinozuka | G02B 7/1821 156/64 |
| 7,940,380 B1 * | 5/2011 | Benner, Jr. | G01D 5/3473 356/138 |

FOREIGN PATENT DOCUMENTS

| | | |
|---|---|---|
| JP | 5-45603 A | 2/1993 |
| JP | 8-313839 A | 11/1996 |

* cited by examiner

[FOURTH EMBODIMENT]

[FOURTH EMBODIMENT]

OPTICAL SCANNER UNIT AND OPTICAL DEVICE

CROSS-REFERENCE TO RELATED APPLICATIONS

This application claims priority to Japanese Patent Application No. 2019-92866 filed on May 16, 2019. The entire disclosure of Japanese Patent Application No. 2019-92866 is hereby incorporated herein by reference.

BACKGROUND

Field of the Invention

The present invention generally relates to an optical scanner unit and an optical device. More specifically, the present invention relates to an optical scanner unit comprising a vibration generator for vibrating a mirror component around a specific swing axis, and an optical device comprising the optical scanner unit.

Background Information

An optical scanner unit comprising a vibration generator that swings a mirror component around a specific swing axis was known in the past (see Japanese Patent Application Publication No. H5-45603 (Patent Literature 1), for example).

Patent Literature 1 discloses a resonant scanner (optical scanner unit) comprising a scanner mirror (mirror component), an actuator (vibration generator), an actuator driver, a vibration detector, and an error detector. With the resonant scanner described in Patent Literature 1, the scanner mirror is connected to the actuator via a torsion spring. The actuator driver drives the actuator with an AC signal near the resonance frequency of the scanner mirror, which causes the scanner mirror to resonate. Two of the vibration detectors are provided at different angular positions to one side of the center position of the angle range of the deflection angle of the scanner mirror (the angle at which the scanner mirror swings), and each of the two vibration detectors independently detects the vibration position (deflection angle) of the scanner mirror. The error detector calculates an error signal for keeping the amplitude of the scanner mirror constant by comparing the detection signal corresponding to the difference between the detection outputs of the vibration detectors with a specific preset signal. The actuator driver is then driven based on the calculated error signal.

SUMMARY

However, with the resonant scanner (optical scanner unit) in Patent Literature 1, the two vibration detectors are both provided to one side of the center position of the deflection angle range of the scanner mirror, so when the center position of the deflection angle range of the scanner mirror is shifted from the initial design position to the other side with respect to the center position of the deflection angle range, one of the two vibration detectors (the vibration detector on the far side from the center position of the deflection angle range) may not be included in the deflection angle range of the scanner mirror. In this case, the deflection angle of the scanner mirror cannot be detected by the vibration detector that is not included in the deflection angle range of the scanner mirror. Accordingly, with the resonant scanner disclosed in Patent Literature 1, if the center position of the deflection angle range of the scanner mirror is shifted from the initial design position to the other side with respect to the center position of the deflection angle range due to a change in ambient temperature or the like, a problem is that it is difficult to accurately detect the deflection angle of the scanner mirror.

One object of this disclosure is to provide an optical scanner unit and an optical device with which the deflection angle of a mirror component can be accurately sensed even when the center position of the deflection angle range of the scanner mirror is shifted from the initial design position due to a change in ambient temperature or the like.

In view of the state of the known technology and in accordance with a first aspect of the present disclosure, an optical scanner unit includes a mirror component, a vibration generator, an optical sensor, and a light shield portion. The mirror component includes a reflective portion for reflecting light. The vibration generator swings the mirror component around a specific swing axis when AC voltage is applied. The optical sensor includes a light emitter and a light receiver for receiving light emitted from the light emitter. The light shield portion is provided to the mirror component so as to swing along with the mirror component. The light shield portion blocks the light emitted from the light emitter. The light receiver further includes a first light receiver that is provided on one swing angle side from a center position of a swing angle range of the light shield portion, and a second light receiver that is provided on the other swing angle side from the center position of the swing angle range.

Also other objects, features, aspects and advantages of the present disclosure will become apparent to those skilled in the art from the following detailed description, which, taken in conjunction with the annexed drawings, discloses one embodiment of the optical scanner and the optical device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

The configuration of a projector 100 according to the first embodiment of the present disclosure will be described with reference to FIGS. 1 to 12. The projector 100 is an example of the "optical device" in the claims.

Figure 1:
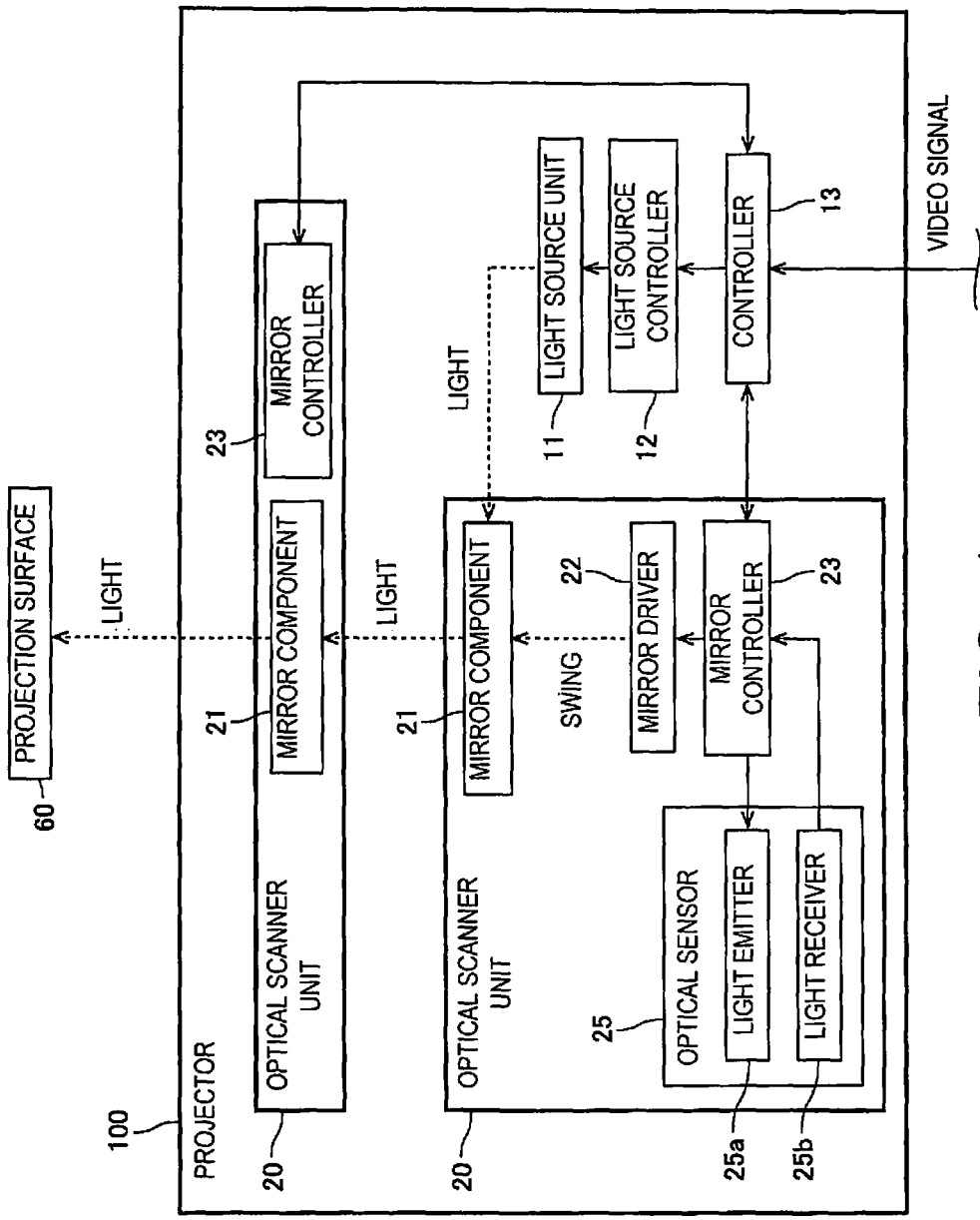
FIG. 1 is a block diagram of the overall configuration of a projector according to a first embodiment of the present disclosure.

As shown in FIG. 1, the projector 100 comprises a light source unit or light source 11, a light source controller 12, an electronic controller 13, and an optical scanner unit or optical scanner 20. The projector 100 is configured to project an image by projecting laser light onto a projection surface 60.

The light source unit 11 is a laser that is configured to output laser light. More specifically, the light source unit 11 irradiates a mirror component 21 included in the optical scanner unit 20 with blue laser light, red laser light, and green laser light, each via a beam splitter or a lens.

The light source controller 12 is a light source driver that is configured to control irradiation with the laser light produced by the light source unit 11 based on control performed by the controller 13. More specifically, the light source controller 12 is configured to control the timing at which each of the blue laser light, the red laser light, and the green laser light are emitted from the light source unit 11, by being controlled by the controller 13.

The controller 13 is configured to control the various parts of the projector 100. The controller 13 is configured to acquire a video signal to be projected onto the projection surface 60 from the outside. The controller 13 is configured to control irradiation with the laser light produced the light source unit 11 via the light source controller 12, based on the acquired video signal. The controller 13 is a microcomputer or a processor with a control program that controls the various parts of the projector 100. The controller 13 can also include other conventional components such as an input interface circuit, an output interface circuit, and storage devices such as a ROM (Read Only Memory) and a RAM (Random Access Memory). It will be apparent to those skilled in the art from this disclosure that the precise structure and algorithms can be any combination of hardware and software that will carry out the functions of the present invention.

The optical scanner unit 20 is configured such that a mirror component 21 is swung while the laser light emitted from the light source unit 11 is reflected by the mirror component 21 so as to be projected onto the projection surface 60. That is, the optical scanner unit 20 is configured to scan a scanning-use laser beam emitted from the light source unit 11 at a predetermined scanning angle. The projector 100 is configured such that two optical scanner units 20 whose scanning directions are perpendicular to each other are used to scan the laser beams in the horizontal direction and the vertical direction of the image. The two optical scanner units 20 have substantially the same configuration, but in FIG. 1 the configuration of one of the two optical scanner units 20 is simplified.

The optical scanner unit 20 comprises the mirror component 21 (e.g., a mirror), the mirror driver 22, a mirror controller 23, a metal member 24 (see FIG. 2), an optical sensor 25, a base member 26, and a light shield portion (e.g., light shield or blocker) 27. With the optical scanner unit 20, the mirror driver 22, the optical sensor 25, and the mirror component 21 are disposed so as to be aligned in the Y direction in that order from Y1 side to Y2 side. That is, in the first embodiment, the optical sensor 25 is disposed between the mirror component 21 and the mirror driver 22. The mirror driver 22 is an example of the "vibration generator" in the claims. The mirror controller 23 is an example of the "controller" in the claims.

Figure 2:
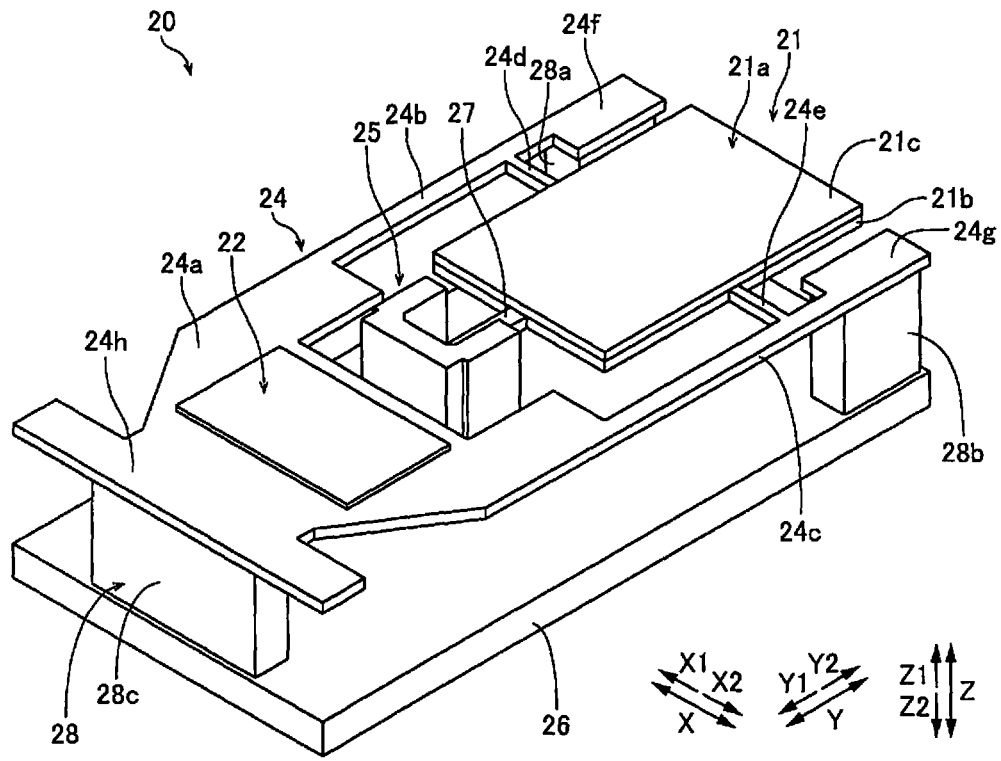
FIG. 2 is an oblique view of an optical scanner unit according to the first embodiment of the present disclosure.

As shown in FIG. 2, the mirror component 21 includes a mirror substrate 21a that reflects light, and a mirror substrate support unit 21b that supports the mirror substrate 21a. The mirror substrate 21a and the mirror substrate support unit 21b are respectively provided on the upper side (Z1 side) and the lower side (Z2 side) of the mirror component 21. The mirror substrate 21a and the mirror substrate support unit 21b are fixed to each other with an adhesive or the like. The mirror substrate 21a is an example of the "reflective portion" in the claims.

Figure 4:
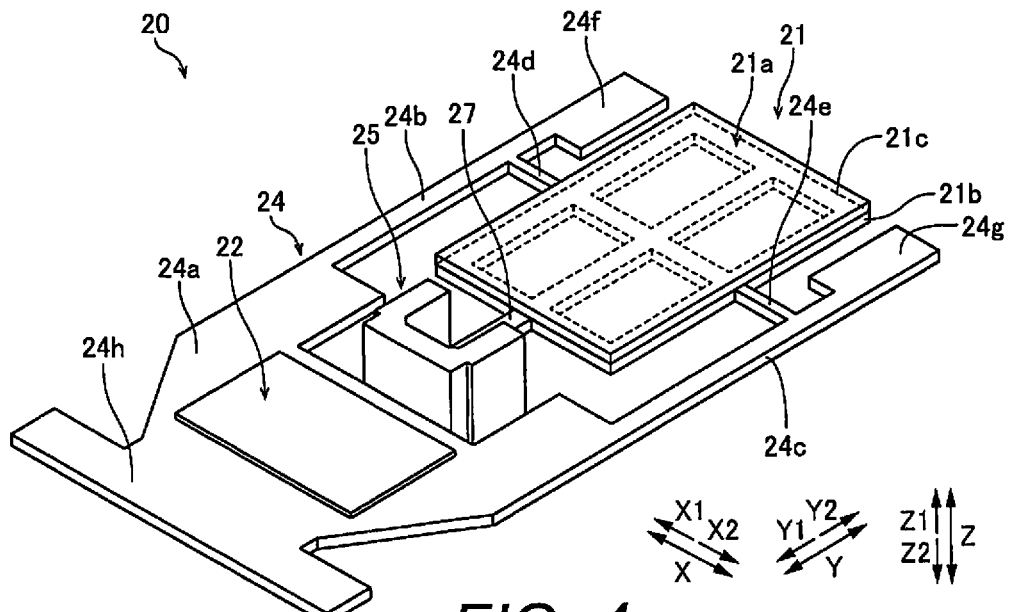
FIG. 4 is another oblique view of the optical scanner unit according to the first embodiment of the present disclosure.

The mirror substrate 21a is formed in a flat shape. The mirror substrate 21a is made of glass. An aluminum film is formed on the light reflecting surface 21c of the mirror substrate 21a. In the direction in which the light reflecting surface 21c of the mirror substrate 21a extends, the size of the mirror substrate support unit 21b is substantially equal to the size of the mirror substrate 21a. As shown in FIG. 4, the mirror substrate support unit 21b is formed in a lattice shape.

Figure 5:
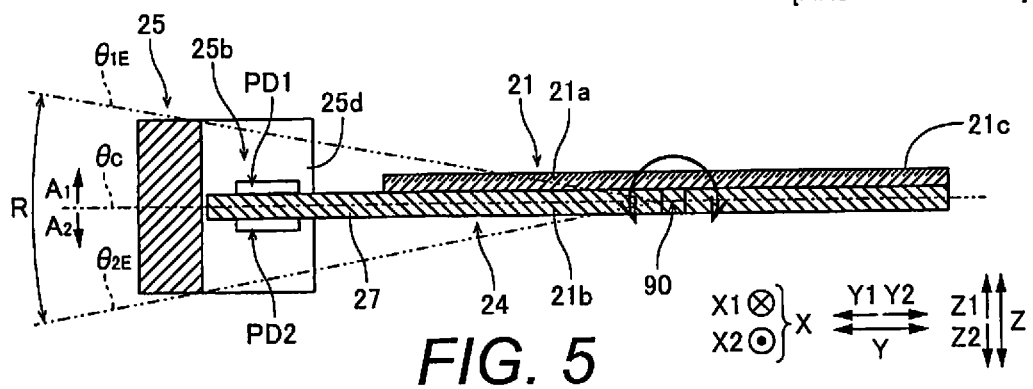
FIG. 5 is a diagram showing the state when the light shield portion of the optical scanner unit according to the first embodiment of the present disclosure is located at the center position of the swing angle range.
Figure 6:
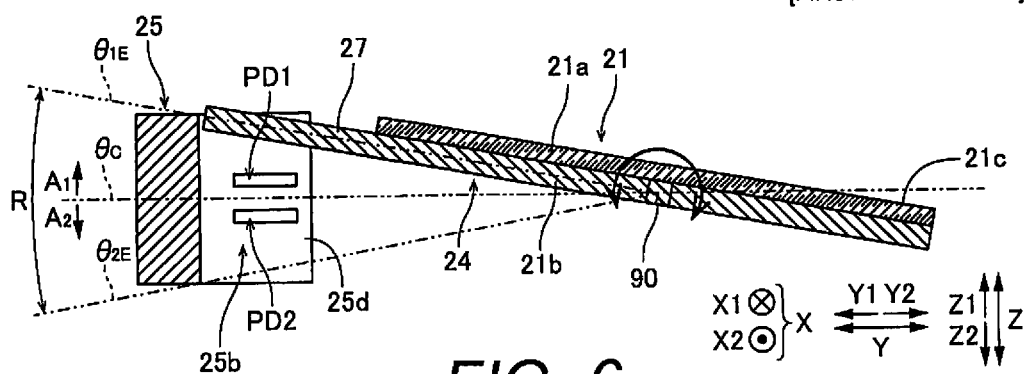
FIG. 6 is a diagram showing the state when the light shield portion of the optical scanner unit according to the first embodiment of the present disclosure is located on one swing angle side of the swing angle range.
Figure 7:
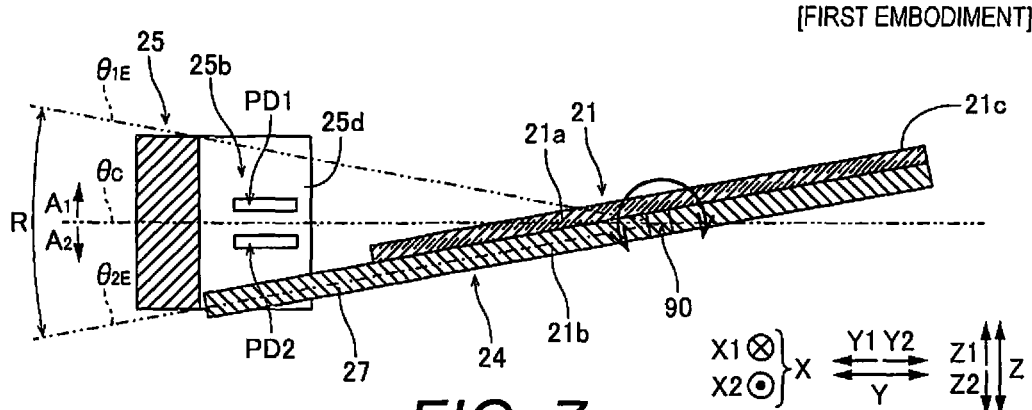
FIG. 7 is a diagram showing the state when the light shield portion of the optical scanner unit according to the first embodiment of the present disclosure is located on the other swing angle side of the swing angle range.
Figure 9:
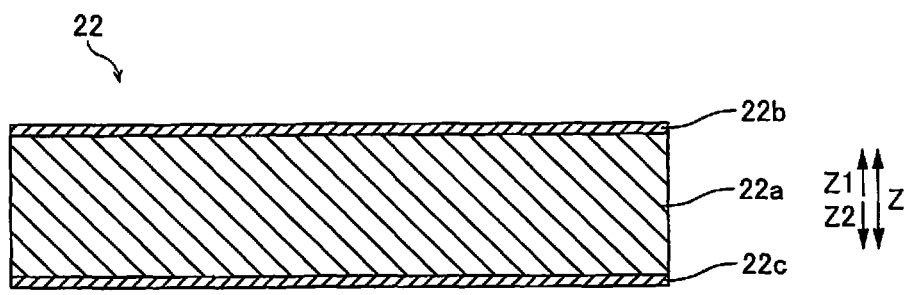
FIG. 9 is a cross section of a mirror driver of the optical scanner unit according to the first embodiment of the present disclosure.

As shown in FIGS. 5 to 7, the mirror driver 22 (see FIG. 1) is configured to swing the mirror component 21 around a specific swing axis 90 when an AC voltage is applied. More specifically, as shown in FIG. 9, the mirror driver 22 includes a piezoelectric body 22a, an upper electrode 22b, and a lower electrode 22c. The piezoelectric body 22a is made of lead zirconate titanate (PZT), which is a dielectric (ferroelectric). The upper electrode 22b and the lower electrode 22c are provided on the upper side (Z1 side) and the lower side (Z2 side) of the piezoelectric body 22a, respectively. The upper electrode 22b and the lower electrode 22c are each mechanically and electrically connected to the piezoelectric body 22a by a conductive adhesive. The piezoelectric body 22a is polarized in the thickness direction (Z direction), and when voltage is applied, the upper side (Z1 side) or the lower side (Z2 side) expands or contracts in the X direction depending on the polarity. Consequently, when AC voltage is applied to the mirror driver 22, the piezoelectric body 22a vibrates at a frequency corresponding to the frequency of the AC voltage. As shown in FIGS. 5 to 7, the vibration generated by the mirror driver 22 propagates through the metal member 24 to the mirror component 21, and as a result the mirror component 21 swings around the specific swing axis 90.

As shown in FIG. 1, the mirror controller 23 is configured to control the various parts of the optical scanner unit 20. The mirror controller 23 is configured to control the drive of the mirror component 21 by the mirror driver 22 based on the control performed by the controller 13. The mirror controller 23 is a microcomputer or a processor with a control program that controls the various parts of the optical scanner unit 20. The mirror controller 23 can also include other conventional components such as an input interface circuit, an output interface circuit, and storage devices such as a ROM (Read Only Memory) and a RAM (Random Access Memory). It will be apparent to those skilled in the art from this disclosure that the precise structure and algorithms can be any combination of hardware and software that will carry out the functions of the present invention.

As shown in FIG. 2, the metal member 24 includes a driver support unit 24a, two beams 24b and 24c, and two hinges 24d and 24e. The metal member 24 is formed in a plate shape extending along the XY plane. The metal member 24 is made of high-strength stainless steel, a special metal, or the like having high tensile strength. The mirror substrate support unit 21b of the mirror component 21 is formed integrally with the metal member 24. That is, the mirror substrate support unit 21b of the mirror component 21 is a part of the metal member 24.

Figure 3:
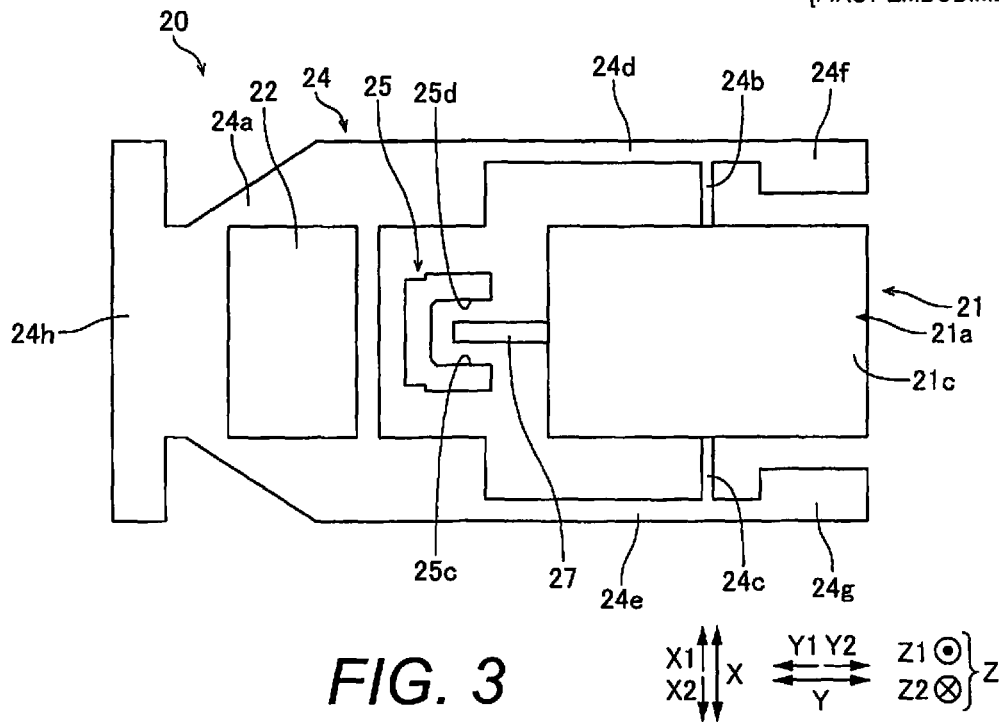
FIG. 3 is a plan view of the optical scanner unit according to the first embodiment of the present disclosure.

The driver support unit 24a is disposed on the lower side (Z2 side) of the mirror driver 22 so as to support the mirror driver 22. As shown in FIG. 3, the driver support unit 24a has a substantially trapezoidal shape when viewed in the Z direction. The driver support unit 24a is formed larger than the mirror driver 22 when viewed in the Z direction.

Each of the two beams 24b and 24c is formed to be smaller in the X direction than the driver support unit 24a when viewed in the Z direction. The beam 24b is provided so as to extend in the Y2 direction from the ends on the Y2 side and the X1 side of the driver support unit 24a. The beam 24c is provided so as to extend in the Y2 direction from the ends on the Y2 side and the X2 side of the driver support unit 24a.

The two hinges 24d and 24e are provided on the X2 side of the beam 24b and the X1 side of the beam 24c, respectively. The hinge 24d is provided so as to extend from the beam 24b toward the X2 side, so as to be connected to the center position in the Y direction of the mirror substrate support unit 21b. The hinge 24e is provided so as to extend from the beam 24c toward the X1 side, so as to be connected to the center position in the Y direction of the mirror substrate support unit 21b. The two hinges 24d and 24e are configured to be torsionally deformable when vibration propagates. Therefore, the vibration of the mirror driver 22 propagates through the two beams 24b and 24c and the mirror substrate support unit 21b of the metal member 24 to the two hinges 24d and 24e, which allows the mirror component 21 connected to the two hinges 24d and 24e to be swung. The central part of a cross section of the two hinges 24d and 24e serves as the swing axis 90 when the mirror component 21 swings.

As shown in FIG. 1, the optical sensor 25 includes a light emitter 25a and a light receiver 25b. In the optical sensor 25, the light emitter 25a and the light receiver 25b are provided facing each other. The optical sensor 25 is configured so that the light receiver 25b detects when the light emitted from the light emitter 25a is blocked by an object, allowing the presence and position of an object to be determined. The optical sensor 25 is a so-called photo interrupter. A detection signal based on the detection result of the light receiver 25b is sent to the mirror controller 23.

As shown in FIG. 3, the optical sensor 25 is formed in an approximate U shape that is open on the Y2 side when viewed in the Z direction. Although not shown in FIG. 3, the light emitter 25a and the light receiver 25b are respectively provided on the surface 25c on the X2 side and the surface 25d on the X1 side inside the substantially U-shaped optical sensor 25. The light emitter 25a is a light emitting diode (LED), for example. The light receiver 25b is a phototransistor, for example.

Figure 8:
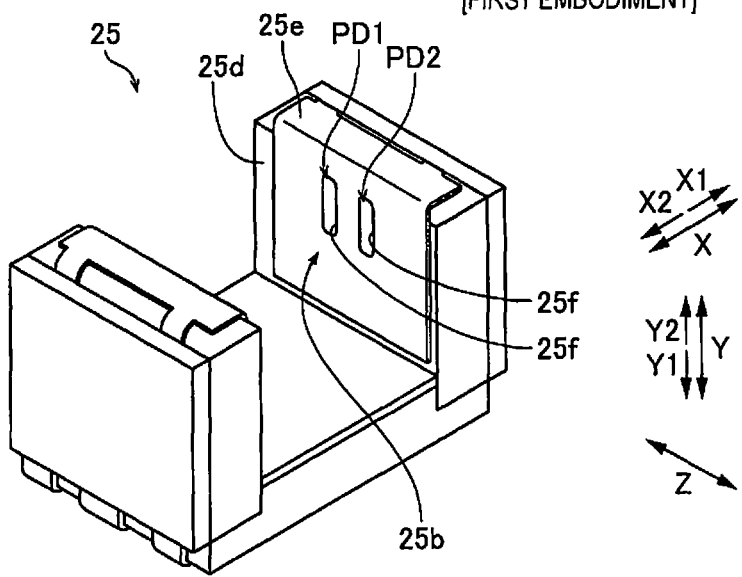
FIG. 8 is an oblique view of an optical sensor of the optical scanner unit according to the first embodiment of the present disclosure.

As shown in FIG. 8, with the optical scanner unit 20, the light receiver 25b includes a first light receiver PD1 and a second light receiver PD2. More specifically, the optical scanner unit 20 is provided with a slit member 25e so as to cover the light receiver 25b. Two slits (openings) 25f that are separated from each other in the Z direction are formed in the slit member 25e. Since the two slits 25f are spaced apart from each other, the light that has passed through each of the two slits 25f is received by the light receiver 25b at detection positions that are apart from each other. That is, when the two slits 25f are used, a single light receiver 25b functions as two light receivers 25b (the first light receiver PD1 and the second light receiver PD2). The optical sensor 25 is fixed to the base member 26 (see FIG. 2) provided on the lower side (Z2 side) of the optical sensor 25.

As shown in FIG. 2, the base member 26 is provided on the lower side (Z2 side) of the metal member 24 (see FIG. 2). The base member 26 is formed in a plate shape so as to extend in the XY plane. The metal member 24 is fixed to the base member 26 via metal support members 28 extending in the Z direction at three fixing positions: a fixing portion 24f, a fixing portion 24g, and a fixing portion 24h. The metal support members 28 may be provided integrally with the base member 26, or may be provided separately from the base member 26. The fixing portion 24f and the fixing portion 24g are provided on the Y2 side of the beam 24b and the beam 24c, respectively. The fixing portion 24f and the fixing portion 24g are longer than the beam 24b and the beam 24c, respectively, in the X direction. A metal support member 28a for fixing the fixing portion 24f to the base member 26, and a metal support member 28b for fixing the fixing portion 24g to the base member 26 are respectively disposed in the approximate center of the fixing portion 24f and the fixing portion 24g when viewed in the Z direction. The metal support member 28a and the metal support member 28b are substantially the same size as the fixed portion 24f and the fixed portion 24g, respectively, when viewed in the Z direction. The fixing portion 24h is provided on the Y1 side of the driver support unit 24a. The metal support member 28c for fixing the fixing portion 24h to the base member 26 is substantially the same size as the fixing portion 24h in the Y direction, and is smaller than the fixing portion 24h in the X direction. A metal support member 28c is disposed in the approximate center of the fixing portion 24h in the X direction when viewed in the Z direction. The fixing portions (24f, 24g, and 24h) and the metal support members 28 (28a, 28b, and 28c) are fixed by screws, bolts, threads, an adhesive, welding, or another such fixing method, for example.

The light shield portion 27 is configured to protrude from the mirror component 21 toward the optical sensor 25 side (Y1 side) along the planar direction in which the light reflecting surface 21c of the mirror substrate 21a extends. More specifically, the light shield portion 27 is provided so as to protrude to the Y1 side from the center position in the X direction on the optical sensor 25 side of the mirror substrate support unit 21b. The light shield portion 27 is formed integrally with the mirror substrate support unit 21b.

As shown in FIGS. 5 to 7, the light shield portion 27 is provided to the mirror component 21 so as to swing along with the mirror component 21, and is configured to block the light emitted from the light emitter 25a in a swing state in which the mirror component 21 swings. More specifically, the mirror controller 23 is configured to perform control to swing the mirror component 21 so that the light shield portion 27 straddles the first light receiver PD1 and the second light receiver PD2 along the light receiver alignment direction (Z direction) in which the first light receiver PD1 and the second light receiver PD2 are arranged. When the mirror component 21 then swings around the swing axis 90, this results in a state in which the light shield portion 27 provided to the mirror component 21 covers the light receiver 25b (the state in FIG. 5), or a state in which the light shield portion 27 provided to the mirror component 21 does not cover the light receiver (the state in FIGS. 6 and 7). FIG. 5 shows a state in which the light shield portion 27 covers part of the first light receiver PD1 and part of the second light receiver PD2.

In the first embodiment, the first light receiver PD1 is provided on one swing angle side $A_1$ from the center position $\theta_C$ of the swing angle range R of the light shield portion 27, and on the center position $\theta_C$ side of the end $\theta_{1E}$ on the one swing angle side $A_1$ of the swing angle range R. Also, the second light receiver PD2 is provided on other swing angle side $A_2$ from the center position $\theta_C$ of the swing angle range R, and on the center position $\theta_C$ side of the end $\theta_{2E}$ on the other swing angle side $A_2$ of the swing angle range R. More specifically, with the optical scanner unit 20, the mirror component 21 is swung at a deflection angle $\theta_A$ (the magnitude of the swing angle range R). The swing angle range R is the range between the end $\theta_{1E}$ on the one swing angle side $A_1$ and the end $\theta_{2E}$ on the other swing angle side $A_2$, with the center position $\theta_C$ in between these ends. In the swing angle range R, the first light receiver PD1 is provided between the center position $\theta_C$ and the end $\theta_{1E}$ on the one swing angle side $A_1$. Also, in the swing angle range R, the second light receiver PD2 is provided between the center position $\theta_C$ and the end $\theta_{2E}$ on the other swing angle side $A_2$.

Figure 10:
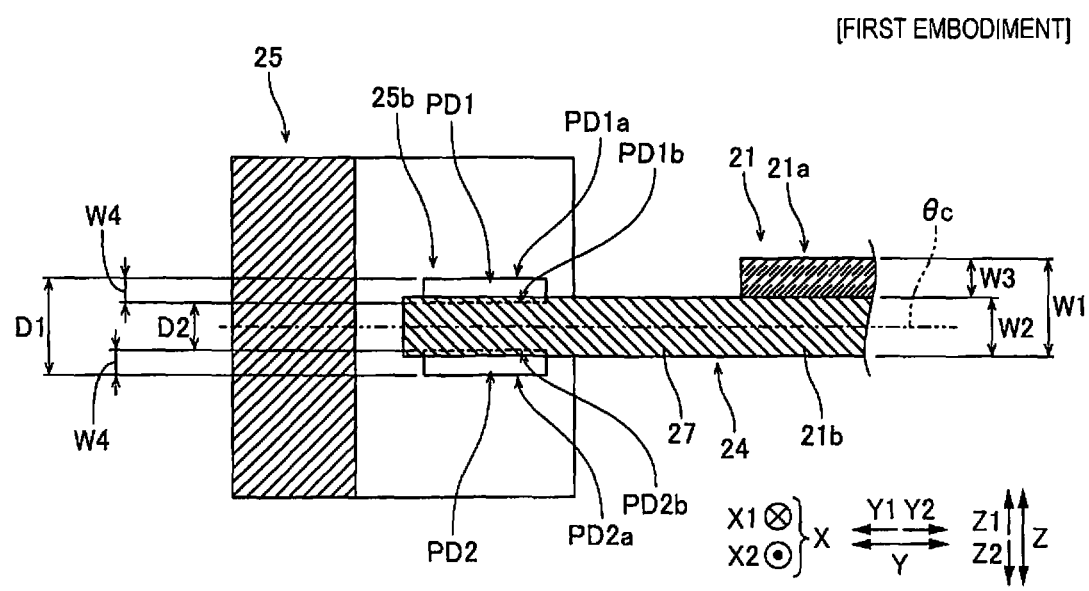
FIG. 10 is a diagram illustrating the width of the light shield portion with respect to the first light receiver and the second light receiver in the light receiver alignment direction in which the first light receiver and the second light receiver of the optical scanner unit according to the first embodiment of the present disclosure are aligned.

Also, as shown in FIG. 10, in the first embodiment, the light shield portion 27 has a width W2 that is less than the distance D1 between the end PD1a on the opposite side of the first light receiver PD1 from the second light receiver PD2 in the light receiver alignment direction (Z direction) in which the first light receiver PD1 and the second light receiver PD2 are arranged, and the end PD2a on the opposite side of the second light receiver PD2 from the first light receiver PD1, and that is not less than the distance D2 between the first light receiver PD1 and the second light receiver PD2. More specifically, when viewed in the X direction, the end PD1b of the first light receiver PD1 on the center position $\theta_C$ side and the end PD2b of the second light receiver PD2 on the center position $\theta_C$ side are separated by a distance D2 in the Z direction. Also, the end PD1a on the one swing angle side $A_1$ of the first light receiver PD1 and the end PD2a on the other swing angle side $A_2$ of the second light receiver PD2 are separated by a distance D1. The width W2 of the light shield portion 27 is greater than the distance D2 and less than the distance D1.

In the first embodiment, the light shield portion 27 has a thickness W2 that is less than the thickness W1 of the mirror component 21 in a direction perpendicular to the direction in which the light reflecting surface 21c of the mirror substrate 21a extends. More specifically, when viewed in the X direction, the thickness W1 of the mirror component 21 is the sum of the thickness W3 of the mirror substrate 21a and the thickness W2 of the mirror substrate support unit 21b. On the other hand, the thickness W2 of the light shield portion 27 is equal to the thickness W2 of the mirror substrate support unit 21b. Therefore, the thickness W2 of the light shield portion 27 is less than the thickness W1 of the mirror component 21 by the thickness W3 of the mirror substrate 21a.

Here, in the first embodiment, the mirror controller 23 (see FIG. 1) is configured to control the AC voltage applied to the mirror driver 22 (see FIG. 1) based on the first period $t_3$ (see FIG. 11) during which the light shield portion 27 straddles the first light receiver PD1 and the second light receiver PD2 between the one swing angle side $A_1$ and the other swing angle side $A_2$ of the swing angle range R. More precisely, the mirror controller 23 is configured to control the AC voltage applied to the mirror driver 22 based on the first period $t_3$, wherein, when the light shield portion 27 moves from the one swing angle side $A_1$ toward the other swing angle side $A_2$ of the swing angle range R, the period $t_3$ from when the light incident on the first light receiver PD1 starts to the blocked until when the blockage of the light incident on the second light receiver PD2 ends is termed the first period.

Figure 11:
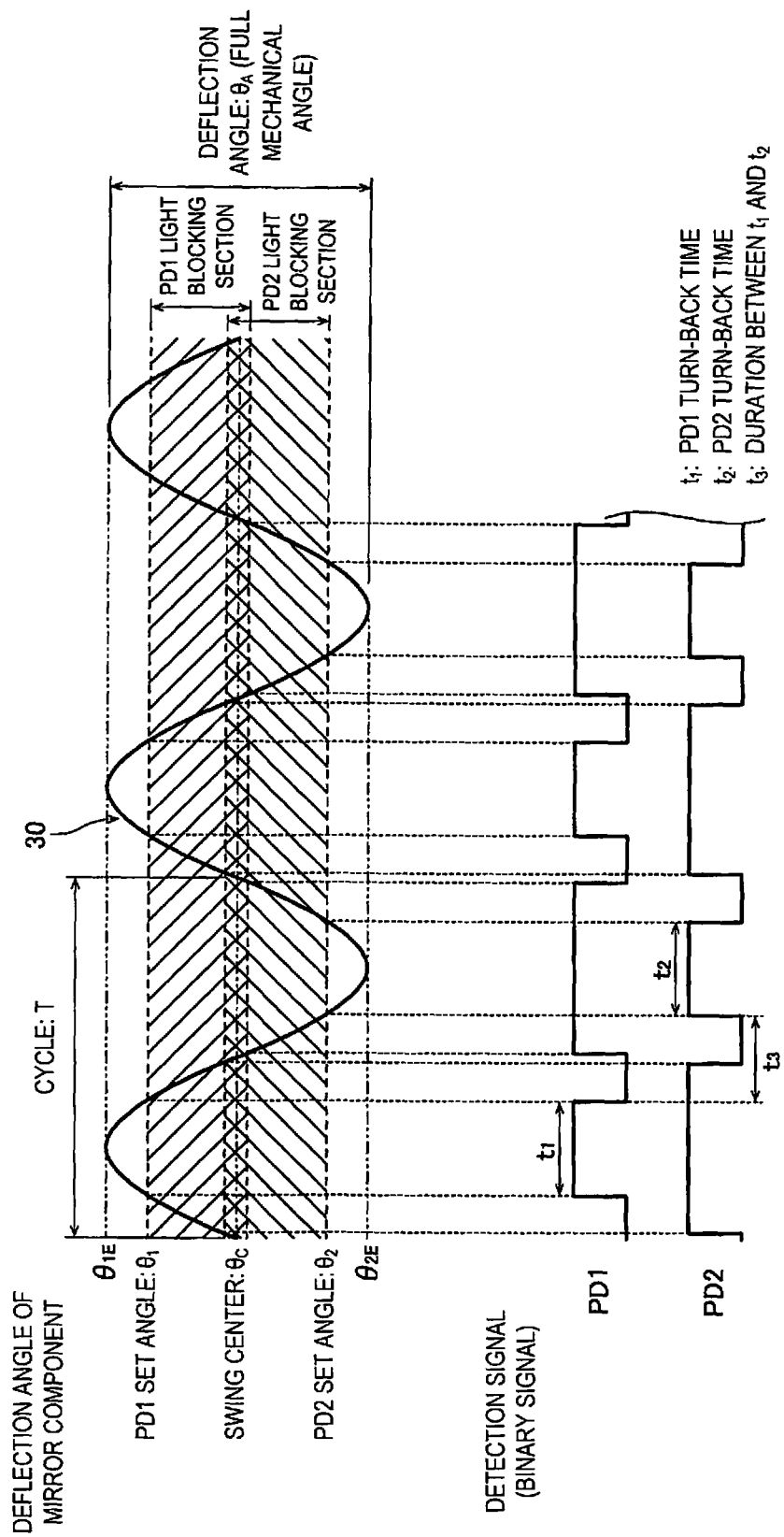
FIG. 11 is a diagram illustrating a detection signal and the mirror deflection angle of the optical scanner unit according to the first embodiment of the present disclosure.

More specifically, as shown in FIG. 11, when the vertical axis and the horizontal axis are respectively the deflection angle of the mirror component 21 (light shield portion 27) and time, a state in which the mirror component 21 (light shield portion 27) has been swung can be expressed by a sinusoidal waveform 30. A state in which the mirror component 21 has been swung so that the light shield portion 27 straddles the first light receiver PD1 and the second light receiver PD2 along the light receiver alignment direction (Z direction) in which the first light receiver PD1 and the second light receiver PD2 are aligned is expressed by the sinusoidal waveform 30, which oscillates between the light blocking section of the first light receiver PD1 and the light blocking section of the second light receiver PD2.

The mirror controller 23 (see FIG. 1) binarizes the detection signal based on the detection result of the light receiver 25b sent from the optical sensor 25 (see FIG. 1) based on a preset threshold value. The binary detection signal (binary signal) is a pulsed signal indicating the HIGH and LOW states of the light blocking section where light is blocked by the light shield portion 27 and the non-light-blocking section where light is not blocked by the light shield portion 27. In the case of the sinusoidal waveform 30 straddling the light blocking section of the first light receiver PD1 and the light blocking section of the second light receiver PD2, two pulses of the first light receiver PD1 (HIGH state) and two pulses of the second light receiver PD2 (HIGH state) are emitted during one cycle T.

In the case of the sinusoidal waveform 30 shown in FIG. 11, binary signals are acquired in the order shown in Table 1 below.

TABLE 1

| Order | Pulse | Edge |
| --- | --- | --- |
| 1 | PD2 long pulse | H |
| 2 | PD1 short pulse | H |
| 3 | PD1 short pulse | L |
| 4 | PD2 long pulse | L |
| 5 | PD1 long pulse | H |
| 6 | PD2 short pulse | H |
| 7 | PD2 short pulse | L |
| 8 | PD1 long pulse | L |

More specifically, first, the timing at which the PD2 long pulse changes from the LOW state to the HIGH state (the timing at which the relatively longer section of the non-light-blocking section of the second light receiver PD2 starts) is acquired. Second, the timing at which the PD1 short pulse changes from the LOW state to the HIGH state (the timing at which the relatively shorter section of the non-light-blocking section of the first light receiver PD1 starts) is acquired. Third, the timing at which the PD1 short pulse changes from the HIGH state to the LOW state (the timing at which the relatively shorter section of the non-light-blocking section of the first light receiver PD1 ends) is acquired. Fourth, the timing at which the PD2 long pulse changes from the HIGH state to the LOW state (the timing at which the relatively longer section of the non-light-blocking section of the second light receiver PD2 ends) is acquired. Fifth, the timing at which the PD1 long pulse changes from the LOW state to the HIGH state (the timing at which the relatively longer section of the non-light-blocking section of the first light receiver PD1 starts) is acquired. Sixth, the timing at which the PD2 short pulse changes from the LOW state to the HIGH state (the timing at which the relatively shorter section of the non-light-blocking section of the second light receiver PD2 starts) is acquired. Seventh, the timing at which the PD2 short pulse changes from the HIGH state to the LOW state (the timing at which the relatively shorter section of the non-light-blocking section of the second light receiver PD2 ends) is acquired. Eighth, the timing at which the PD1 long pulse changes from the HIGH state to the LOW state (the timing at which the relatively longer section of the non-light-blocking section of the first light receiver PD1 ends) is acquired. The above pulses are acquired during a single cycle T. The order in which the pulses are acquired varies depending on the amplitude of the sinusoidal waveform 30, the timing at which the acquisition of pulses is started, a change in the center position of the swing angle range, and so forth.

The mirror controller 23 is configured to calculate the deflection angle $\theta_A$ (the magnitude of the swing angle range R) of the mirror component 21 based on the binarized detection signal (binary signal), and to perform PID control so as to obtain a constant deflection angle $\theta_A$ (swing angle range R).

First, before performing feedback control when the projector 100 is to be used, the mirror controller 23 acquires the set angle θ1 of the first light receiver PD1 and the setting angle θ2 of the second light receiver PD2 during attachment of the optical scanner unit 20 to the projector 100, etc. The set angle $\theta_1$ of the first light receiver PD1 corresponds to the end on the one swing angle side $A_1$ of the light blocking section by the first light receiver PD1 (when the light shield portion 27 moves to the one swing angle side $A_1$, the timing at which the blockage of the light incident on the first light receiver PD1 by the light shield portion 27 ends). Also, the set angle $\theta_2$ of the second light receiver PD2 corresponds to the end on the other swing angle side $A_2$ of the light blocking section by the second light receiver PD2 (when the light block part 27 moves to the other swing angle side $A_2$, the timing at which the blockage of the light incident on the second light receiver PD2 by the light shield portion 27 ends).

The mirror controller 23 gradually raises the voltage applied to the mirror driver 22, resulting in a state in which two pulses from the first light receiver PD1 and two pulses from the second light receiver PD2 are outputted in a single cycle. The set angle $\theta_1$ and the set angle $\theta_2$ are calculated based on the following formulas (1) and (2).

Formula (1):
$$\theta_1 = \frac{\theta_A}{2}\cos\left(\pi \times \frac{t_1}{T}\right) \qquad (1)$$

Formula (2):
$$\theta_2 = -\frac{\theta_2}{2}\cos\left(\pi \times \frac{t_2}{T}\right) \qquad (2)$$

Here, $\theta_A$ is the deflection angle of the light shield portion 27 (mirror component 21) (the magnitude of the swing angle range R). $\theta_A$ is acquired by swinging the mirror component 21 and sensing the scanning angle of the light being scanned as the mirror component 21 swings. T is a cycle. The cycle T is acquired based on the timing at which a pulse is acquired. In the case of the sinusoidal waveform 30 in FIG. 11, this corresponds to the period from when the first of the eight pulses is acquired until the eighth is acquired. Also, $t_1$ is the time it takes to turn back to the one swing angle side $A_1$ side of the first light receiver PD1 (corresponds to the time it takes to pass through the non-light-blocking section on the one swing angle side $A_1$ side of the light blocking section of the first light receiver PD1). $t_2$ is the time it takes to turn back to the other swing angle side $A_2$ side of the second light receiver PD2 (corresponds to the time it takes to pass through the non-light-blocking section on the other swing angle side $A_2$ side of the light blocking section of the second light receiver PD2). The set angle θ1 of the first light receiver PD1 and the set angle θ2 of the second light receiver PD2 are acquired in a state in which two pulses from the first light receiver PD1 and two pulses from the second light receiver PD2 are emitted during one cycle.

When the projector 100 is to be used, the mirror controller 23 gradually raises the voltage applied to the mirror driver 22 to create a state in which two pulses are emitted from the first light receiver PD1 and two from the second light receiver PD2 during one cycle. The mirror controller 23 then monitors $t_3$ every cycle, and performs PID control so that $t_3$ approaches the target time $t_B$. The target time $t_B$ is calculated based on the following formula (3).

Formula (3):

$$t_B = \frac{T_B}{2} - \frac{\arccos\left(2 \times \frac{\theta_1}{\theta_B}\right)}{\pi} \times T_B - \frac{\arccos\left(2 \times \frac{(-\theta_2)}{\theta_B}\right)}{\pi} \times T_B \quad (3)$$

Here, $\theta_B$ is the target deflection angle. $T_B$ is the set cycle. For θ1 and θ2, values acquired from the above formulas (1) and (2) are used. $t_3$ is the period sandwiched between $t_1$ and $t_2$.

Table 2 below shows the tentatively calculated values when the mirror component 21 is controlled to have a constant deflection angle $\theta_A$ (the magnitude of the swing angle range R) using the above-mentioned $t_3$. Also, Table 3 shows the tentatively calculated values when the mirror component 21 is controlled to have a constant deflection angle $\theta_A$ (the magnitude of the swing angle range R) using the above-mentioned $t_1$ or $t_2$ as a reference value.

TABLE 2

When controlled using $t_1$ or $t_2$ (target angle: 5 deg, set angle: 1.5 deg)

| Light shield portion initial positional offset | Distance between reference position and set angle (mm) | Set angle after shift (deg) | Deflection angle (deg) |
| --- | --- | --- | --- |
| −0.30 | 0.22 | 0.64 | 2.13 |
| −0.25 | 0.27 | 0.78 | 2.61 |
| −0.20 | 0.32 | 0.93 | 3.09 |
| −0.15 | 0.37 | 1.07 | 3.57 |
| −0.10 | 0.42 | 1.21 | 4.04 |
| −0.05 | 0.47 | 1.36 | 4.52 |
| 0.00 | 0.52 | 1.50 | 5.00 |
| 0.05 | 0.57 | 1.64 | 5.48 |
| 0.10 | 0.62 | 1.79 | 5.96 |
| 0.15 | 0.67 | 1.93 | 6.43 |
| 0.20 | 0.72 | 2.07 | 6.91 |
| 0.25 | 0.77 | 2.22 | 7.39 |
| 0.30 | 0.82 | 2.36 | 7.87 |

TABLE 3

When controlled using $t_3$ (target angle: 5 deg, set angle 1: 1.5 deg, set angle 2: −1.5 deg)

| Light shield portion initial positional offset (mm) | Distance between reference position and set angle 1 (mm) | Distance between reference position and set angle 2 (mm) | Set angle 1 after shift (deg) | Set angle 2 after shift (deg) | Deflection angle (deg) |
| --- | --- | --- | --- | --- | --- |
| −0.30 | 0.22 | 0.82 | 0.64 | 2.36 | 5.44 |
| −0.25 | 0.27 | 0.77 | 0.78 | 2.22 | 5.31 |
| −0.20 | 0.32 | 0.72 | 0.93 | 2.07 | 5.20 |
| −0.15 | 0.37 | 0.67 | 1.07 | 1.93 | 5.11 |
| −0.10 | 0.42 | 0.62 | 1.21 | 1.79 | 5.05 |
| −0.05 | 0.47 | 0.57 | 1.36 | 1.64 | 5.01 |
| 0.00 | 0.52 | 0.52 | 1.50 | 1.50 | 5.00 |
| 0.05 | 0.57 | 0.47 | 1.64 | 1.36 | 5.01 |
| 0.10 | 0.62 | 0.42 | 1.79 | 1.21 | 5.05 |
| 0.15 | 0.67 | 0.37 | 1.93 | 1.07 | 5.11 |
| 0.20 | 0.72 | 0.32 | 2.07 | 0.93 | 5.20 |
| 0.25 | 0.77 | 0.27 | 2.22 | 0.78 | 5.31 |
| 0.30 | 0.82 | 0.22 | 2.36 | 0.64 | 5.44 |

Figure 12:
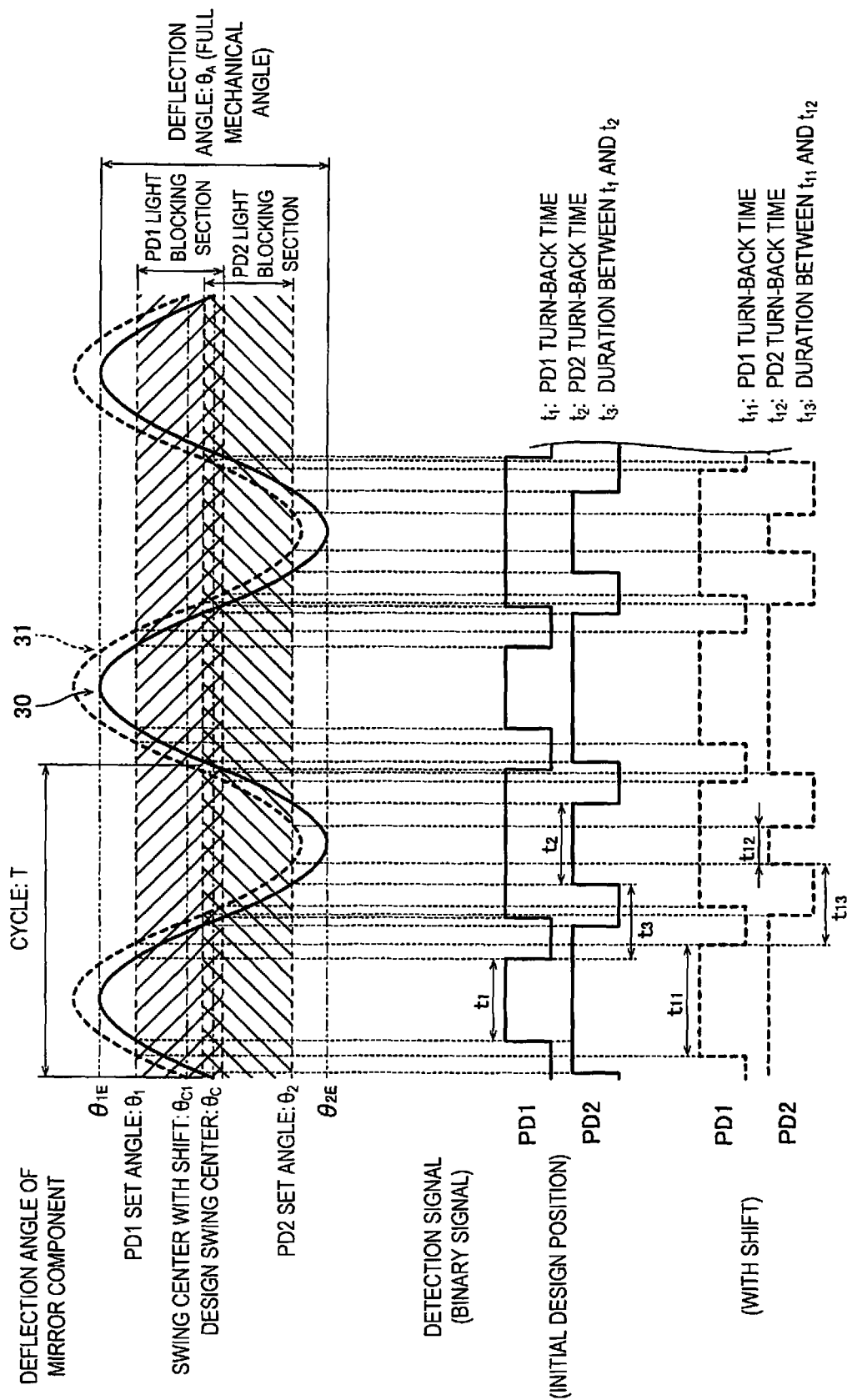
FIG. 12 is a diagram illustrating the detection signal when the deflection angle of the mirror in the optical scanner unit according to the first embodiment of the present disclosure has been shifted.

Tables 2 and 3 show the tentatively calculated values when the target angle (target deflection angle $\theta_B$) of the deflection angle $\theta_A$ to be kept constant (the magnitude of the swing angle range R) is set to 5 degrees, and the set angles ($\theta_1$ and $\theta_2$) of the light receiver 25b is set to an angle position that is 1.5 degrees from the center position $\theta_C$ of the swing angle range R. As shown in Table 2, when the mirror component 21 is controlled to have a constant deflection angle $\theta_A$ (the magnitude of the swing angle range R) using $t_3$, a positional shift from the initial position of the light shield portion 27 causes an angular shift of a maximum of about 10% in the deflection angle $\theta_A$ with respect to the target angle (target deflection angle $\theta_B$) of 5 degrees. On the other hand, as shown in Table 2, when $t_1$ or $t_2$ is used to control the mirror component 21 to have a constant swing angle $\theta_A$ (the magnitude of the swing angle range R), a positional shift from the initial position of the light shield portion 27 causes an angular shift of a maximum of at least 50% in the deflection angle $\theta_A$ with respect to the target angle (target deflection angle $\theta_B$) of 5 degrees. The reason for this is that, in the sinusoidal waveform, $t_3$ is a portion where the proportional change (angular acceleration) in the slope (the proportional change (angular velocity) of the deflection angle (vertical axis) versus time (horizontal axis)) is relatively small (this portion does not include turn-back), whereas $t_1$ and $t_2$ are portions where the proportional change (angular acceleration) in the slope is relatively large (these are portions that do include turn-back). More specifically, as shown in FIG. 12, when the light shield portion 27 has shifted from its initial position (the sinusoidal waveform 30) to the sinusoidal waveform 31, there is relatively little change between the initial position $t_3$ and $t_{13}$ after the shift, but the change between the initial position $t_1$ and $t_{11}$ after the shift, and the change between the initial position $t_2$ and $t_{12}$ after the shift are relatively large.

In the first embodiment, the mirror controller 23 is configured to acquire the shift in the center position $\theta_C$ of the swing angle range R based on the period $t_1$ in which the light shield portion 27 is positioned on the one swing angle side $A_1$ of the swing angle range R from the position where it blocks the light incident on the first light receiver PD1, and the period $t_2$ in which the light shield portion 27 is positioned on the other swing angle side $A_2$ of the swing angle range R from the position where it blocks the light incident on the second light receiver PD2. More specifically, as shown in FIG. 12, when the center position $\theta_C$ of the swing angle range R has shifted to the one swing angle side $A_1$ of the swing angle range R, the period in which the light shield portion 27 is positioned on the one swing angle side $A_1$ of the swing angle range R becomes longer than at the position where the light incident on the first light receiver PD1 is blocked ($t_1$ changes to $t_{11}$, which is longer than $t_1$). Although not depicted in the drawings, when the center position $\theta_C$ of the swing angle range R has shifted to the other swing angle side $A_2$ of the swing angle range R, the period in which the light shield portion 27 is positioned on the other swing angle side $A_2$ of the swing angle range R becomes longer than at the position where the light incident on the second light receiver PD2 is blocked. Therefore, the mirror controller 23 is able to determine how much the center position $\theta_C$ of the swing angle range R has shifted to either the one swing angle side $A_1$ or the other swing angle side $A_2$ based on $t_1$ and $t_2$.

Effect of First Embodiment

The following effect can be obtained with the first embodiment.

In the first embodiment, as discussed above, the first light receiver PD1 of the optical sensor 25 is provided on the one swing angle side $A_1$ of the center position $\theta_C$ of the swing angle range R of the light shield portion 27, and the second light receiver PD2 of the optical sensor 25 is provided on the other swing angle side $A_2$ of the center position $\theta_C$ of the swing angle range R. Consequently, even if the light shield portion 27 is shifted from its initial design position to either the one swing angle side $A_1$ or the other swing angle side $A_2$ of the center position $\theta_C$ of the swing angle range R, it will be less likely that either the first light receiver PD1 or the second light receiver PD2 of the optical sensor 25 will not be included in the swing angle range R of the light shield portion 27 (the angle range of the deflection angle $\theta_A$ of the mirror component 21), so it will also be less likely that it will be impossible to detect the deflection angle $\theta_A$ of the mirror 21 based on the light incident on the first light receiver PD1, or the deflection angle $\theta_A$ of the mirror 21 based on the light incident on the second light receiver PD2. As a result, even when the center position $\theta_C$ of the angle range of the deflection angle $\theta_A$ of the mirror component 21 has shifted from its initial design position due to a change in ambient temperature or the like, the deflection angle $\theta_A$ of the mirror component 21 can still be sensed very accurately.

Also, in the first embodiment, as described above, the first light receiver PD1 is provided on the one swing angle side $A_1$ of the center position $\theta_C$ of the swing angle range R and on the center position $\theta_C$ side of the end $\theta_{1E}$ of the one swing angle side $\theta_A$ of the swing angle range R, and the second light receiver PD2 is provided on the other swing angle side $A_2$ of the center position $\theta_C$ of the swing angle range R and on the center position $\theta_C$ side of the end $\theta_{2E}$ of the other swing angle side $A_2$ of the swing angle range R. Consequently, the light shield portion 27 can be swung so as to straddle the position where the first light receiver PD1 is provided and the position where the second light receiver PD2 is provided. Therefore, even when the light shield portion 27 is shifted from its initial design position to the one swing angle side $A_1$ of the swing angle range R, it will be less likely that it will be impossible to sense the deflection angle $\theta_A$ of the mirror component 21 based on the light incident on the second light receiver PD2 provided on the other swing angle side $A_2$ of the swing angle range R. Also, even when the light shield portion 27 is shifted from its design initial position to the other swing angle side $A_2$ of the swing angle range R, it will be less likely that it will be impossible to sense the deflection angle $\theta_A$ of the mirror component 21 based on the light incident on the first light receiver PD1 provided on the one swing angle side $A_1$ of the swing angle range R. As a result, even when the light shield portion 27 is shifted from its design initial position to either the one swing angle side $A_1$ or the other swing angle side $A_2$ of the swing angle range R, it will be even less likely that it will be impossible to sense the deflection angle $\theta_A$ of the mirror component 21 based on the light incident on the first light receiver PD1, or to sense the deflection angle $\theta_A$ of the mirror component 21 based on the light incident on the second light receiver PD2.

Also, in the first embodiment, as described above, the light shield portion 27 is configured to have a width W2 that is less than the distance D1 between the end PD1a on the opposite side of the first light receiver PD1 from the second light receiver PD2 in the light receiver alignment direction (Z direction) in which the first light receiver PD1 and the second light receiver PD2 are arranged, and the end PD2a on the opposite side of the second light receiver PD2 from the first light receiver PD1. Consequently, the light emitted from the light emitter 25a can be detected by both the first light receiver PD1 and the second light receiver PD2 in a state in which the light shield portion 27 is disposed in the center position $\theta_C$ of the swing angle range R. As a result, in a stationary state in which the light shield portion 27 has been stopped for assembly, maintenance, or the like of the device, the light shield portion 27 can be easily positioned (centered) in the center position $\theta_C$ of the swing angle range R by comparing the amounts of light detected by first light receiver PD1 and the second light receiver PD2.

In the first embodiment, as described above, the light shield portion 27 is configured to have a width W2 that is less than the distance D1 between the end PD1a on the opposite side of the first light receiver PD1 from the second light receiver PD2 in the light receiver alignment direction (Z direction), and the end PD2a on the opposite side of the second light receiver PD2 from the first light receiver PD1, and that is not less than the distance D2 between the first light receiver PD1 and the second light receiver PD2. Consequently, in a state in which the light shield portion 27 is disposed in the central position $\theta_C$ of the swing angle range R, the light shield portion 27 covers a part of both the first light receiver PD1 and the second light receiver PD2, so when the light shield portion 27 is moved to the one swing angle side $A_1$ or the other swing angle side $A_2$ of the swing angle range R, the amounts of light sensed by the first light receiver PD1 and the second light receiver PD2 can be changed. As a result, the amounts of light sensed by the first light receiver PD1 and the second light receiver PD2 can be compared very accurately, so the positioning (centering) in which the light shield portion 27 is disposed in the central position $\theta_C$ of the swing angle range R can be carried out more accurately during device assembly, maintenance, etc.

Also, in the first embodiment, as described above, the optical scanner unit 20 is configured to comprise the mirror controller 23, which performs control to swing the mirror component 21 so that the light shield portion 27 straddles the first light receiver PD1 and the second light receiver PD2 along the light receiver alignment direction (Z direction) in which the first light receiver PD1 and the second light receiver PD2 are aligned. The mirror controller 23 is configured to control the AC voltage applied to the mirror driver 22 based on the first period $t_3$, in which the light shield portion 27 straddles the first light receiver PD1 and the second light receiver PD2 between the one swing angle side $A_1$ and the other swing angle side $A_2$ of the swing angle range R. Consequently, the AC voltage applied to the mirror driver 22 can be controlled based on the period (first period) $t_3$, in which there is less effect when the light shield portion 27 is shifted from its initial design position to the one swing angle side $A_1$ or the other swing angle side $A_2$ of the center position $\theta_C$ of the swing angle range R in the sinusoidal waveform 30 in which time and the angle position of the deflection angle $\theta_A$ of the light shield portion 27 in a swing state in which the light shield portion 27 has been swung are represented by the vertical and horizontal axes, respectively. As a result, based on the first period $t_3$, even when the light shield portion 27 has undergone the above-mentioned shift, the magnitude of the swing angle range R (the deflection angle $\theta_A$) can be accurately controlled to obtain the desired value by controlling the AC voltage applied to the mirror driver 22 so that the first period $t_3$ becomes a previously calculated target value (target time $t_B$).

In the first embodiment, as described above, the mirror controller 23 is configured to control the AC voltage applied to the mirror driver 22 based on the first period $t_3$, where the first period $t_3$ is the period from the start of the blockage of the light incident on the first light receiver PD1 until the end of the blockage of the light incident on the second light receiver PD2 when the light shield portion 27 moves from the one swing angle side $A_1$ of the swing angle range R toward the other swing angle side $A_2$. Consequently, the first period $t_3$ can be acquired based on the period from the start of the blockage of the light incident on the first light receiver PD1 until the end of the blockage of the light incident on the second light receiver PD2 when the light shield portion 27 moves from the one swing angle side $A_1$ of the swing angle range R toward the other swing angle side $A_2$, and the AC voltage applied to the mirror driver 22 can be reliably controlled based on a period in which the above-mentioned shift does not greatly affect the above-mentioned sinusoidal waveform 30 (the first period $t_3$).

Also, in the first embodiment, as described above, the mirror controller 23 is configured to acquire the shift in the center position $\theta_C$ of the swing angle range R based on the period $t_1$ in which the light shield portion 27 is located on the one swing angle side $A_1$ of the swing angle range from the position where the light shield portion 27 blocks the light incident on the first light receiver PD1, and the period $t_2$ in which the light shield portion 27 is located on the other swing angle side $A_2$ of the swing angle range R from the position where the light shield portion 27 blocks the light incident on the second light receiver PD2. Consequently, it is possible to ascertain how much the center position $\theta_C$ of the swing angle range R has shifted to either the one swing angle side $A_1$ or the other swing angle side $A_2$. As a result, shifting of the center position $\theta_C$ of the swing angle range R in the optical scanner unit 20 can be properly controlled, such as mechanically correcting the orientation of the optical scanner unit 20 on the projector 100 side, or using software to adjust the magnitude of the swing angle (deflection angle $\theta_A$) and the timing at which light is emitted to irradiate the mirror component 21 of the optical scanner unit 20 according to the amount of shift in the center position $\theta_C$ of the swing angle range R, by outputting the information about the shift of the center position $\theta_C$ of the swing angle range R to the projector 100 equipped with the optical scanner unit 20.

In the first embodiment, as described above, the optical sensor 25 is disposed between the mirror component 21 and the mirror driver 22. Consequently, if the mirror component 21 and the mirror driver 22 are fixed to the base member 26 at the corners (the fixing portion 24f and the fixing portion 24g) or at the outer periphery (the fixing portion 24h) in order to stabilize the swinging of the mirror component 21, the optical sensor 25 can be disposed at a position that is away from the position where the mirror component 21 and the mirror driver 22 are fixed (the corners or the outer periphery), as compared to when the optical sensor 25 is disposed on the opposite side (Y2 side) of the mirror component 21 from the mirror driver 22, or on the opposite side (Y1 side) of the mirror driver 22 from the mirror component 21, etc. As a result, it is possible to suppress the vibration of the optical sensor 25 attributable to the propagation of vibration produced by the mirror driver 22 to the optical sensor 25, so it is less likely that there will be a decrease in the sensing accuracy of the deflection angle $\theta_A$ of the mirror component 21 based on the light incident on the light receiver 25b of the optical sensor 25.

Also, in the first embodiment, as described above, the light shield portion 27 is configured to protrude from the mirror component 21 toward the optical sensor 25 along the planar direction in which the surface 21c of the mirror substrate 21a extends. The light shield portion 27 is configured to have a thickness W2 that is less than the thickness W1 of the mirror component 21 in a direction (Z direction) perpendicular to the direction (Y direction) in which the surface 21c extends. Consequently, since the thickness W2 of the light shield portion 27 is less than the thickness W1 of the mirror component 21, the mass of the light shield portion 27 is less likely to increase. As a result, it is possible to suppress the decrease in the resonance frequency of the vibrating portion, which decreases as the mass of the vibrating portion including the light shield portion 27 and the mirror component 21 increases, which would otherwise be attributable to an increase in the mass of the light shield portion 27 protruding from the mirror component 21 toward the optical sensor 25, as well as deviation in the location of the center of gravity of the vibrating portion, and the like.

Second Embodiment

A second embodiment will be described with reference to FIGS. 13 and 14. In the second embodiment, we will describe an example in which a light shield portion 227 is configured to have a width W22 that is less than the distance D2 between the first light receiver PD1 and the second light receiver PD2 in the light receiver alignment direction (Z direction), unlike with the optical scanner unit 20 in the first embodiment in which the light shield portion 27 was configured to have a width W2 that was not less than the distance D2 between the first light receiver PD1 and the second light receiver PD2 in the light receiver alignment direction. In addition, in the drawings, those components that are the same as in the first embodiment will be numbered the same.

Figure 13:
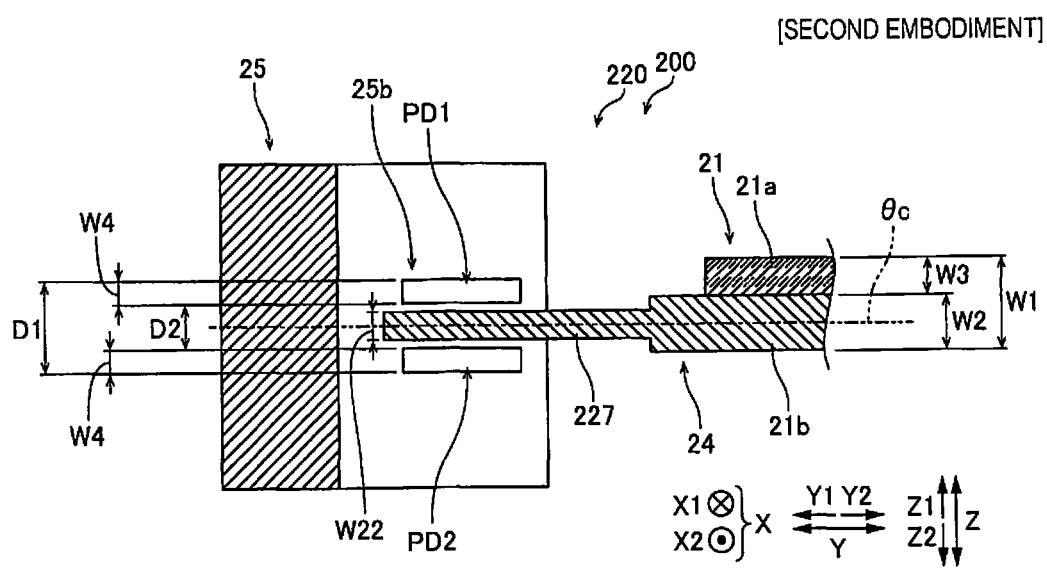
FIG. 13 is a diagram showing the light shield portion of the optical scanner unit according to a second embodiment of the present disclosure.

As shown in FIG. 13, a projector 200 according to the second embodiment of the present disclosure comprises an optical scanner unit 220. The projector 200 is an example of the "optical device" in the claims.

The optical scanner unit 220 comprises the light shield portion 227. In the second embodiment, the light shield portion 227 has a width W22 that is less than the distance D2 between the first light receiver PD1 and the second light receiver PD2 in the light receiver alignment direction (Z direction). More specifically, the light shield portion 227 is similar to the optical scanner unit 20 in the first embodiment in that it is formed integrally with the mirror substrate support unit 21b. On the other hand, unlike the optical scanner unit 20 of the first embodiment in which the thickness W2 of the mirror substrate support unit 21b and the thickness W2 of the light shield portion 27 were substantially equal, the thickness W227 of the light shield portion 227 is less than the thickness W2 of the mirror substrate support unit 21b. The thickness W227 of the light shield portion 227 is less than the distance D2 between the end PD1b on the center position $\theta_C$ side of the first light receiver PD1 and the end PD2b on the center position $\theta_C$ side of the second light receiver PD2.

Figure 14:
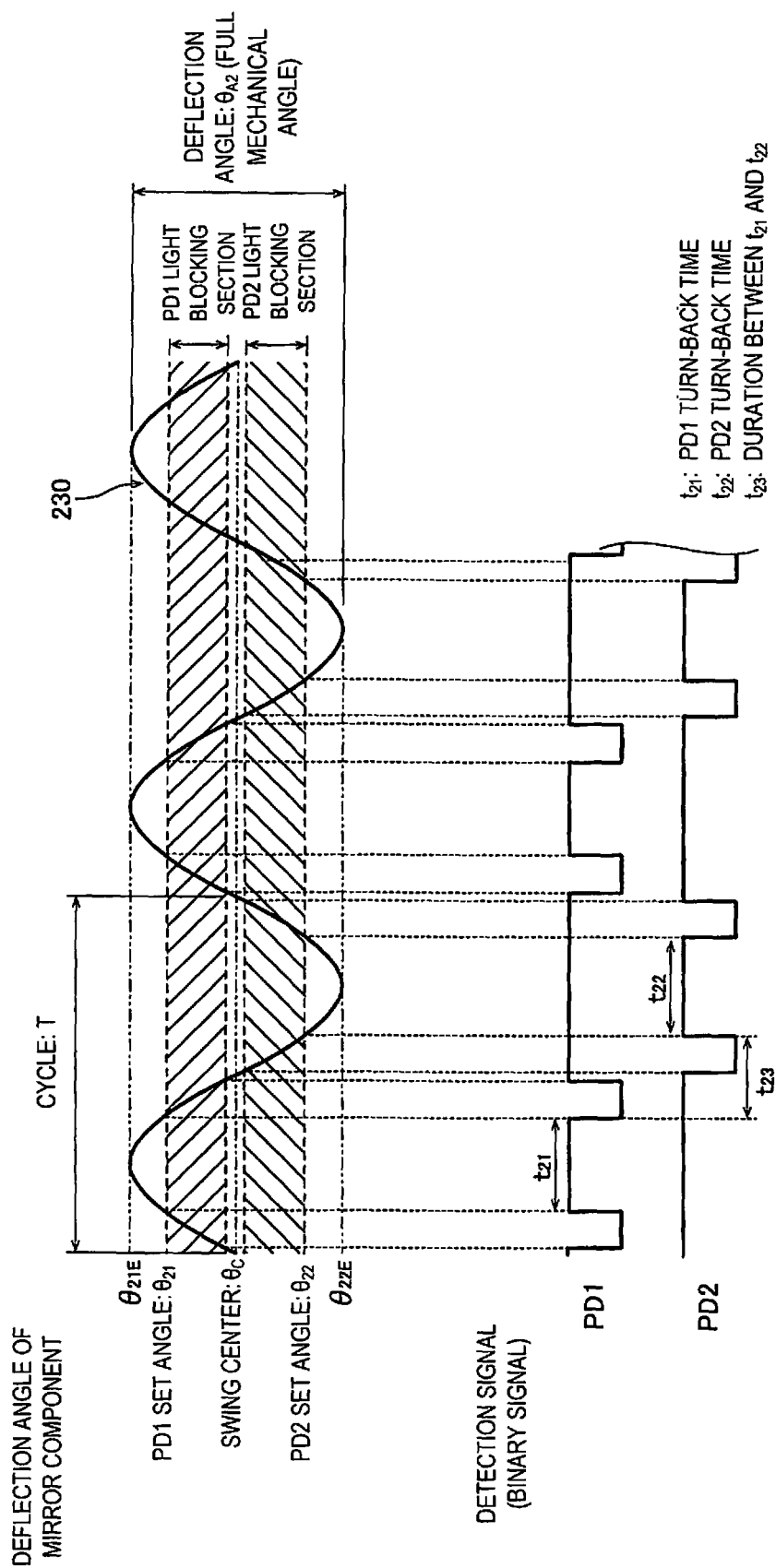
FIG. 14 is a diagram illustrating a detection signal and the mirror deflection angle of the optical scanner unit according to the second embodiment of the present disclosure.

As shown in FIG. 14, with the optical scanner unit 220, the light shield portion 227 has a width W22 that is less than the distance D2 between the first light receiver PD1 and the second light receiver PD2 in the light receiver alignment direction (Z direction), and therefore, in the sinusoidal waveform 230, the width of the vertical axis of the light blocking section by the first light receiver PD1 and the light blocking section by the second light receiver PD2 is reduced. That is, the set angle $\theta_{21}$ of the first light receiver PD1 and the set angle $\theta_{22}$ of the second light receiver PD2 are on the center position $\theta_C$ side of the set angle $\theta_1$ of the first light receiver PD1 and the set angle $\theta_2$ of the second light receiver PD2 in the sinusoidal waveform 30 of the first embodiment. Therefore, even if the end $\theta_{21E}$ on the one swing angle side $A_1$ of the swing angle range R and the end 022E on the other swing angle side $A_2$ of the swing angle range R are on the center position $\theta_C$ side of the end $\theta_{1E}$ on the one swing angle side $A_1$ of the swing angle range R and the end $\theta_{2E}$ on the other swing angle side $A_2$ of the swing angle range R in the sinusoidal waveform 30 of the first embodiment, the light shield portion 27 can still be swung so as to straddle the first light receiver PD1 and the second light receiver PD2.

The rest of the configuration of the projector 200 according to the second embodiment is the same as that in the first embodiment.

Effect of Second Embodiment

In the second embodiment, as described above, the light shield portion 227 is configured to have a width W22 that is less than the distance D2 between the first light receiver PD1 and the second light receiver PD2 in the light receiver alignment direction (Z direction). Consequently, the width W22 of the light shield portion 227 is less than when the light shield portion 227 has a width not less than the distance D2 between the first light receiver PD1 and the second light receiver PD2 in the light receiver alignment direction, so in a swing state in which the light shield portion 227 has been swung, the angle range required for the light shield portion 227 to straddle the first light receiver PD1 and the second light receiver PD2 can be reduced. As a result, even when the swing angle range R (the magnitude of the deflection angle $\theta_A$) is reduced, the light shield portion 227 can be swung so as to straddle the position where the first light receiver PD1 is provided and the position where the second light receiver PD2 is provided, so even if the deflection angle $\theta_A$ of the mirror component 21 is small, it will still be possible to detect the deflection angle $\theta_A$ of the mirror component 21 accurately.

The rest of the effect of the second embodiment is the same as that in the first embodiment above.

Third Embodiment

A third embodiment will be described with reference to FIGS. 15 to 17. In this third embodiment, an example is described in which a light receiver 325b is configured to include a third light receiver PD3 in addition to the first light receiver PD1 and the second light receiver PD2. In the drawings, those portions with the same configuration as in the first embodiment above are numbered the same.

Figure 15:
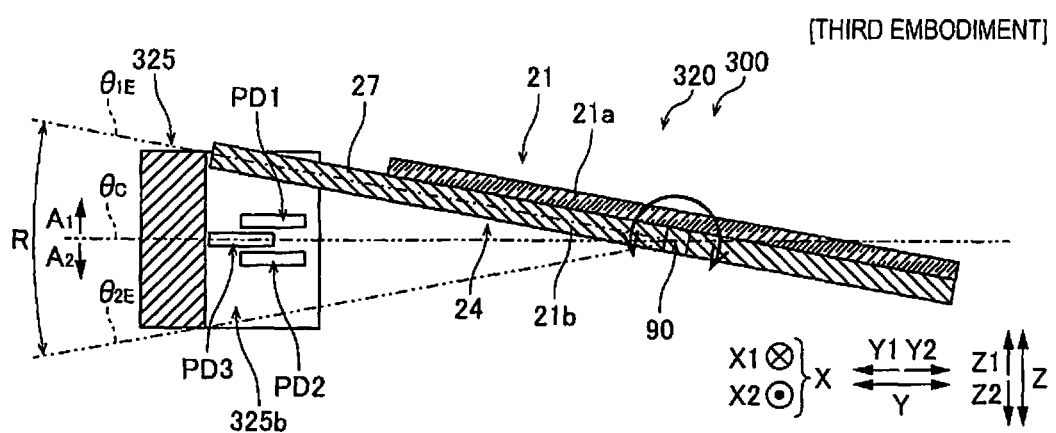
FIG. 15 is a side view of the optical sensor of the optical scanner unit according to a third embodiment of the present disclosure.

As shown in FIG. 15, a projector 300 according to the third embodiment of the present disclosure comprises an optical scanner unit 320. The projector 300 is an example of the "optical device" in the claims.

The optical scanner unit 320 comprises an optical sensor 325. In the third embodiment, the optical sensor 325 includes a light receiver 325b. The light receiver 325b includes the first light receiver PD1, the second light receiver PD2, and the third light receiver PD3.

The third light receiver PD3 is provided between the first light receiver PD1 and the second light receiver PD2, so as to be separated from the first light receiver PD1 and the second light receiver PD2 along the light receiver alignment direction (Z direction) in which the first light receiver PD1 and the second light receiver PD2 are arranged.

Figure 16:
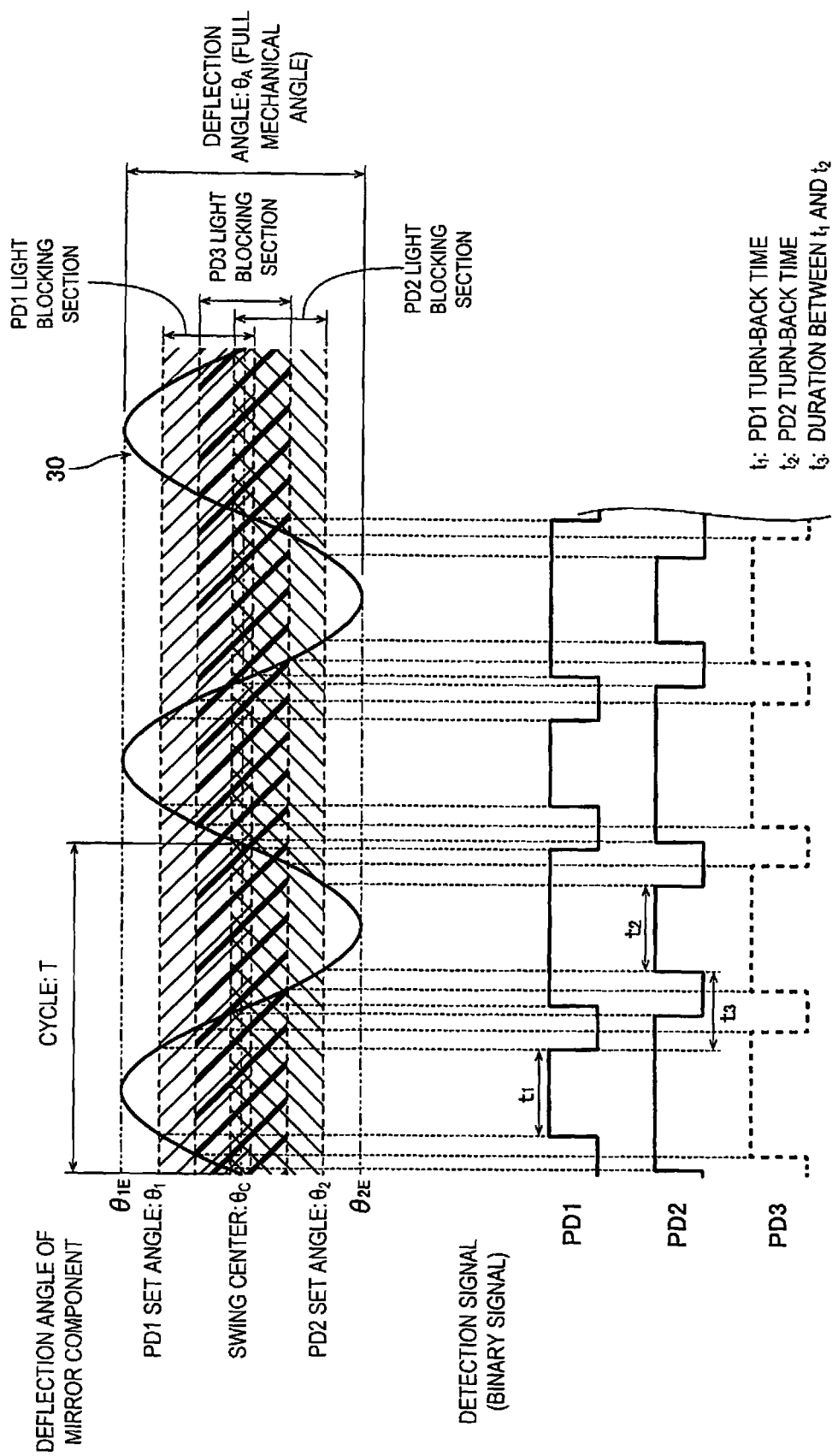
FIG. 16 is a diagram illustrating a detection signal and the mirror deflection angle of the optical scanner unit according to the third embodiment of the present disclosure.

As shown in FIG. 16, because the optical scanner unit 320 includes not only the first light receiver PD1 and the second light receiver PD2, but also the third light receiver PD3 that is provided between the first light receiver PD1 and the second light receiver PD2, two pulses are outputted from each of the first light receiver PD1, the second light receiver PD2, and the third light receiver PD3 during a single cycle T. With the optical scanner unit 320, $t_3$ is calculated based on the detection signals from the first light receiver PD1 and the second light receiver PD2 in a normal state, and the mirror component 21 is controlled to a constant deflection angle $\theta_A$ (the magnitude of the swing angle range R) based on the calculated $t_3$.

Figure 17:
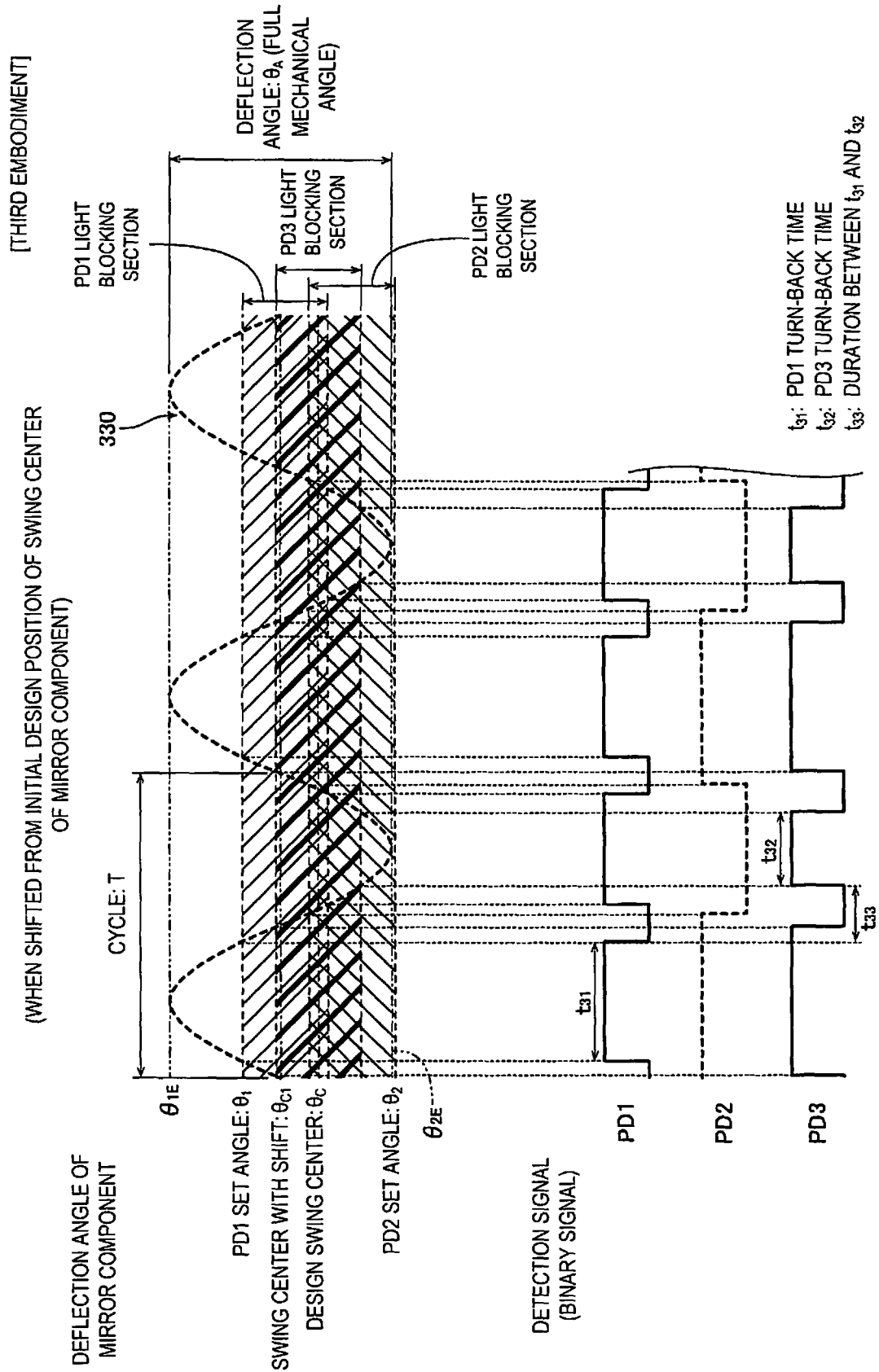
FIG. 17 is a diagram illustrating the detection signal when the deflection angle of the mirror in the optical scanner unit according to the third embodiment of the present disclosure has been shifted.

As shown in FIG. 17, when the center position $\theta_C$ of the angle range of the deflection angle $\theta_A$ of the mirror component 21 (the swing angle range R of the light shield portion 27) is shifted from its initial position to the one swing angle side $A_1$ of the swing angle range R (in the case of the sinusoidal waveform 330), only one pulse leaves the second light receiver PD2 within a single cycle T, which means that $t_3$ cannot be calculated based on the detection signals of the first light receiver PD1 and the second light receiver PD2. In view of this, the optical scanner unit 320 is configured to use the detection signal of the third light receiver PD3 instead of that of the second light receiver PD2. That is, with the optical scanner unit 320, $t_{33}$ is calculated based on the detection signals of the first light receiver PD1 and the third light receiver PD3, and the mirror component 21 is controlled to a constant deflection angle $\theta_A$ (the magnitude of the swing angle range R) based on the calculated $t_{33}$.

The rest of the configuration of the projector 300 according to the third embodiment is the same as that in the first embodiment above.

Effect of Third Embodiment

In the third embodiment, as described above, the light shield portion 27 is configured to include the third light receiver PD3, which is provided between the first light receiver PD1 and the second light receiver PD2, so as to be away from the first light receiver PD1 and the second light receiver PD2 along the light receiver alignment direction (Z direction) in which the first light receiver PD1 and the second light receiver PD2 are arranged. Consequently, even if either of the first light receiver PD1 and the second light receiver PD2 is not included in the swing angle range R of the light shield portion 27 due to the fact that the center position $\theta_C$ of the angle range of the deflection angle $\theta_A$ of the mirror section 21 (the swing angle range R of the light blocking section 27) is shifted from its initial position, the deflection angle $\theta_A$ of the mirror component 21 (the magnitude of the swing angle range R) based on the light incident on the two light receivers 325b can still be sensed by using the one of the first light receiver PD1 and the second light receiver PD2 that is included in the swing angle range R and the third light receiver PD3.

The rest of the effect of the third embodiment is the same as in first embodiment above.

Fourth Embodiment

A fourth embodiment will be described with reference to FIGS. 18 and 19. In this fourth embodiment, an example is described in which a cover member 41 is provided so as to cover the optical sensor 25. In the drawings, those portions with the same configuration as in the first embodiment above are numbered the same.

Figures 18, 19:
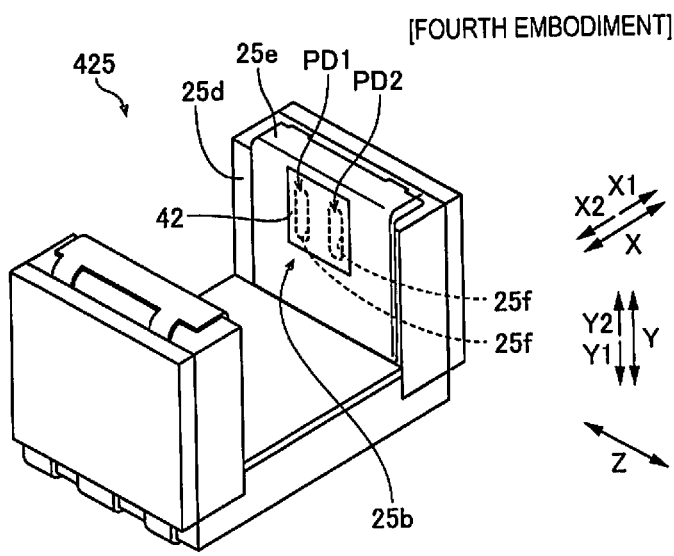
FIG. 18 is an oblique view of an optical scanner unit according to a fourth embodiment of the present disclosure.
FIG. 19 is a diagram illustrating a filter member provided to the light receiver of the optical sensor in the optical scanner unit according to a fourth embodiment of the present disclosure.

As shown in FIG. 18, a projector 400 according to the fourth embodiment of the present disclosure comprises an optical scanner unit 420. The projector 400 is an example of the "optical device" in the claims.

In the fourth embodiment, the optical scanner unit 420 comprises a cover member 41 provided so as to cover the optical sensor 25. More specifically, the cover member 41 is provided more on the upper side (Z1 side) than the metal member 24, which is formed in a plate shape when viewed from the Z direction, so as to cover the approximate half on the Y1 side of the metal member 24, and not to cover the approximate half on the Y2 side. Consequently, the cover member 41 is in a state of covering the optical sensor 25 and the mirror driver 22 from the upper side (Z1 side), and not covering the mirror component 21 from the upper side (Z2 side). That is, the cover member 41 is provided so that the scanning laser light incident on the mirror component 21 will not be blocked by the cover member 41.

The optical scanner unit 420 also comprises an optical sensor 425. As shown in FIG. 19, the optical sensor 425 comprises a filter member 42 provided near the light receiver 25b so that light incident on the light receiver 25b will pass through. The filter member 42 is configured so as to allow light in a wavelength band corresponding to the light emitted by the light emitter 25a to pass through.

The rest of the configuration of the projector 400 according to the fourth embodiment is the same as that in the first embodiment above.

Effect of Fourth Embodiment

In the fourth embodiment, as described above, the optical scanner unit 420 is configured to comprise the cover member 41, which is provided so as to cover the optical sensor 25. Consequently, disturbance light such as stray light generated within the optical scanner unit 420 (unnecessary reflected light), or light that is incident from the outside of the optical scanner unit 420, will be less likely to be incident on the optical sensor 25 covered by the cover member 41, so it is possible to suppress any decrease in the accuracy at which the deflection angle of the mirror component 21 is sensed based on the light incident on the light receiver 25b, which would otherwise be due to disturbance light.

Also, in the fourth embodiment, as described above, the configuration is such that the filter member 42 is provided near the light receiver 25b so that light incident on the light receiver 25b will pass through, and allows light in the wavelength band corresponding to the light emitted from the light emitter 25a to pass through. Consequently, light outside the wavelength band corresponding to the light emitted from the light emitter 25a is less likely to be incident on the light receiver 25b in the vicinity of which is provided the filter member 42, so it is possible to suppress any decrease in the accuracy at which the deflection angle of the mirror component 21 is sensed based on the light incident on the light receiver 25b, which would otherwise be due to disturbance light such as stray light generated within the optical scanner unit 420 (unnecessary reflected light), or light that is incident from the outside of the optical scanner unit 420.

The rest of the effect of the fourth embodiment is the same as that in the first embodiment above.

Fifth Embodiment

A fifth embodiment will be described with reference to FIGS. 20 to 22. In this fifth embodiment, an example is described in which, if the first period $t_3$ cannot be acquired, the AC voltage applied to the mirror driver 22 is controlled based on a period that is different from the first period $t_3$, instead of the first period $t_3$. In the drawings, those portions with the same configuration as in the first embodiment above are numbered the same.

Figure 20:
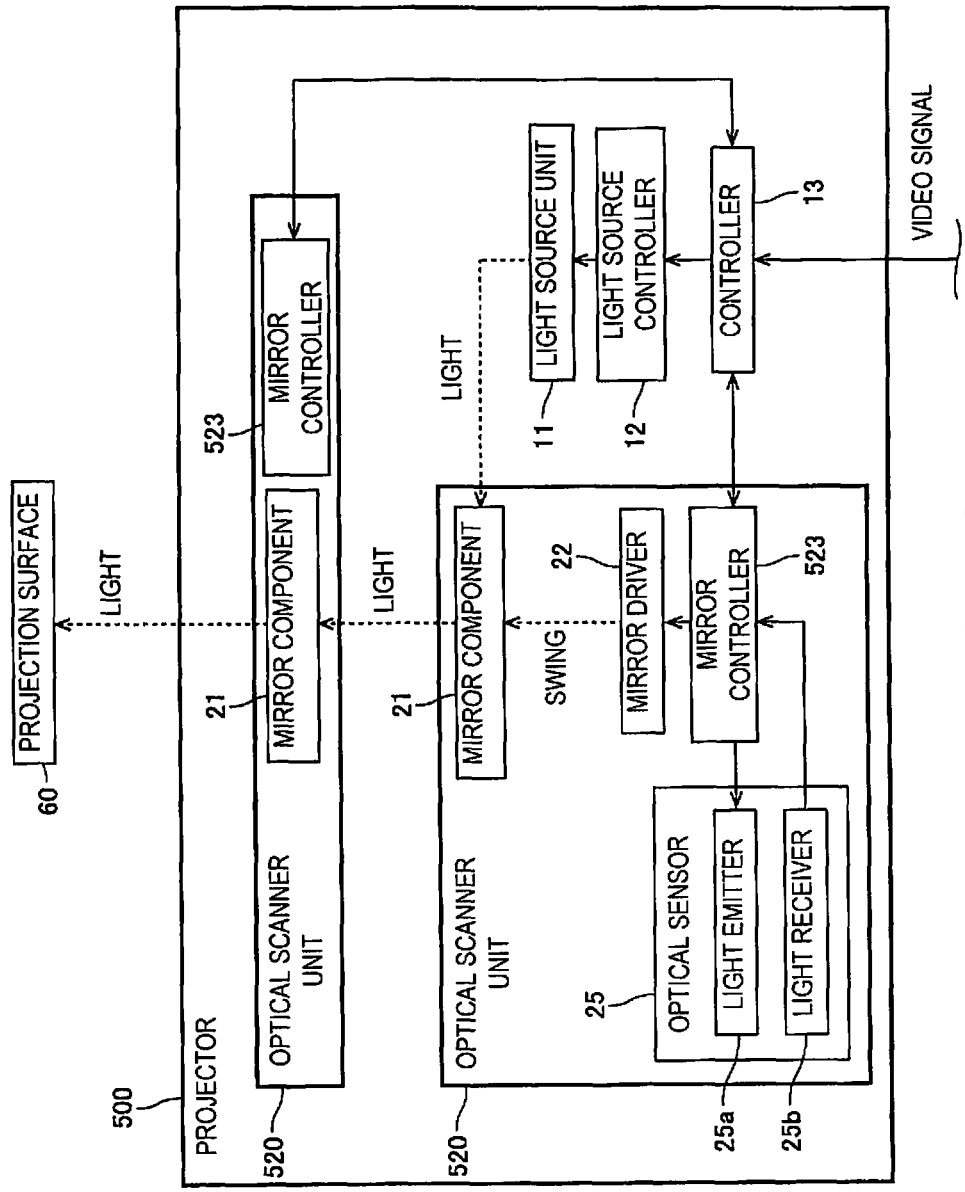
FIG. 20 is a block diagram of the overall configuration of a projector according to a fifth embodiment of the disclosure.

As shown in FIG. 20, a projector 500 according to the fifth embodiment of the present disclosure comprises an optical scanner unit 520. The optical scanner unit 520 comprises a mirror controller 523. The projector 500 is an example of the "optical device" in the claims.

Figure 21:
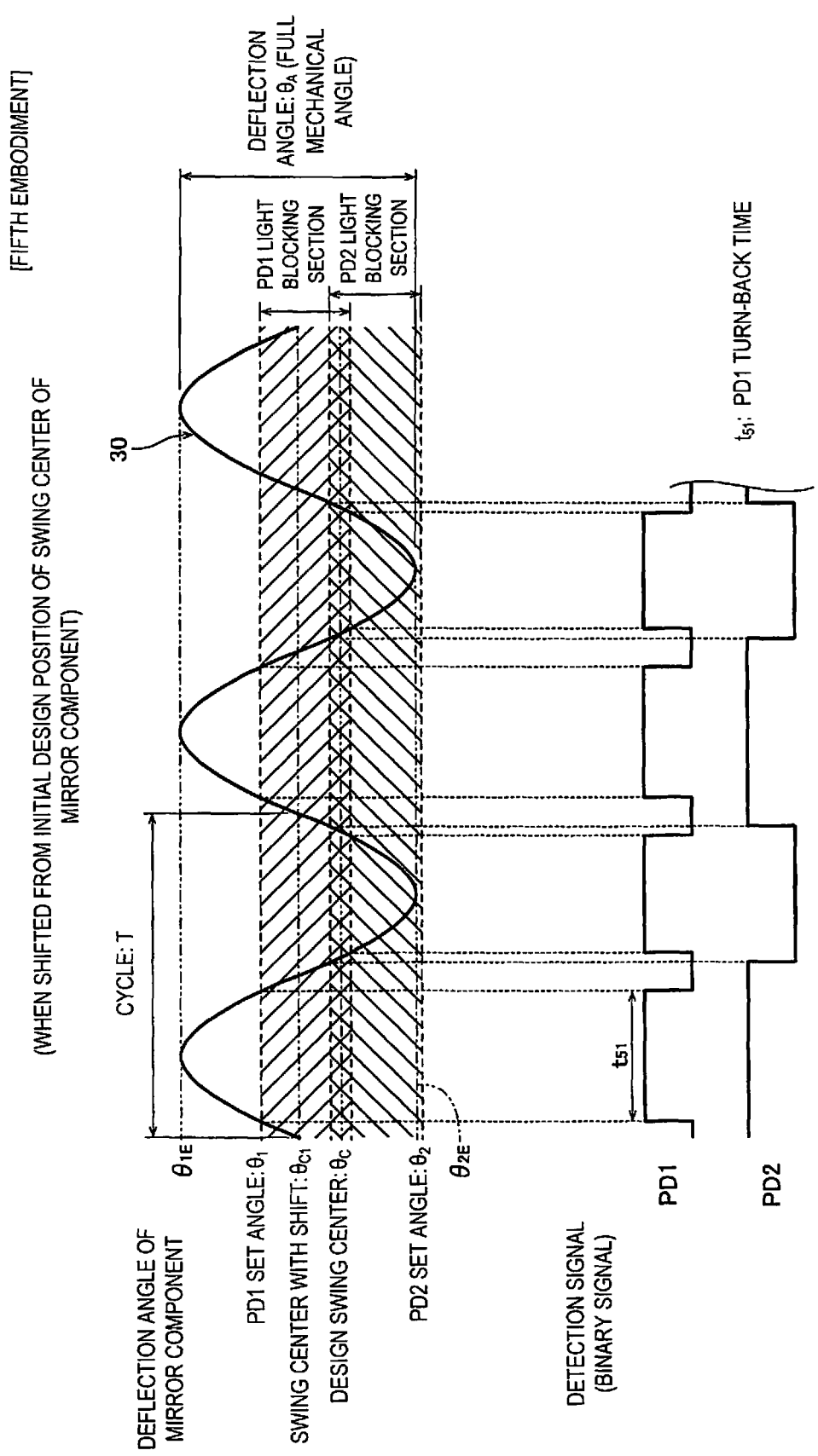
FIG. 21 is a diagram illustrating the detection signal when the deflection angle of the mirror in an optical scanner unit according to a fifth embodiment of the present disclosure has shifted to one swing angle side.

As shown in FIG. 21, in the fifth embodiment, the mirror controller 523 (see FIG. 20) is configured so that when the light shield portion 27 is in a swing state in which it does not straddle the first light receiver PD1, the AC voltage applied to the mirror driver 22 is controlled based on a second period $t_{S1}$ instead of the first period $t_3$, where this second period $t_{S1}$ is the period in which the light shield portion 27 is positioned more on the other swing angle side $A_2$ of the swing angle range R than the position where it blocks the light incident on the second light receiver PD2. Incidentally, $t_{S1}$ is the turn-back time on the one swing angle side $A_1$ of the first light receiver PD1 (corresponds to the duration of passage through the light-non-blocking section on the one swing angle side $A_1$ of the light-blocking section of the first light receiver PD1).

Figure 22:
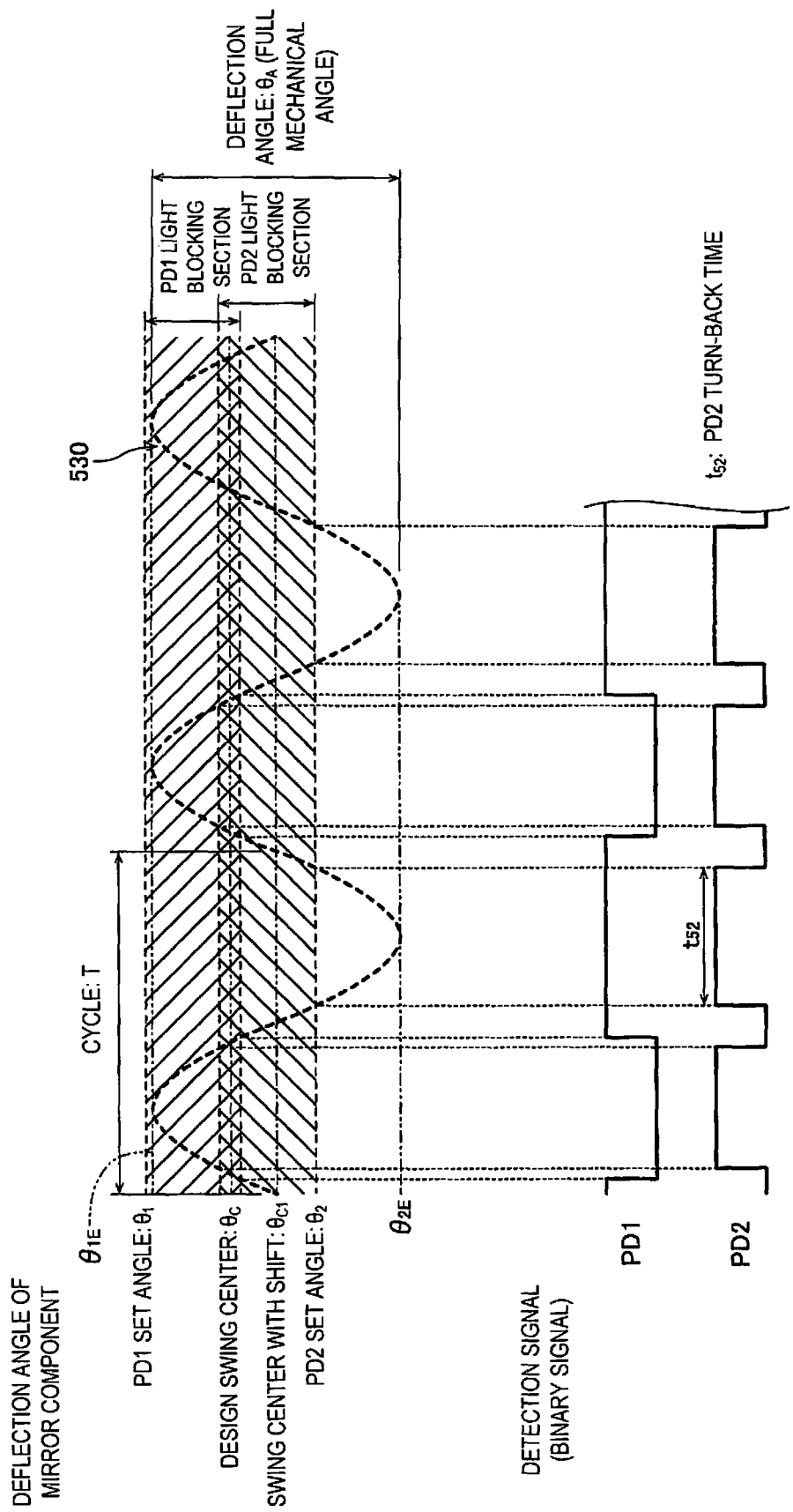
FIG. 22 is a diagram illustrating the detection signal when the deflection angle of the mirror in the optical scanner unit according to the fifth embodiment of the present disclosure has shifted to the other swing angle side.

As shown in FIG. 22, the mirror controller 523 (see FIG. 20) is configured such that when the light shield portion 27 is in a swing state in which it does not straddle the second light receiver PD2, the AC voltage applied to the mirror driver 22 is controlled based on a second period $t_{S2}$ instead of the first period $t_3$, where this second period $t_{S2}$ is the period in which the light shield portion 27 is positioned more on the one swing angle side $A_1$ of the swing angle range R than the position where it blocks the light incident on the first light receiver PD1. Incidentally, $t_{S2}$ is the turn-back time on the other swing angle side $A_2$ of the second light receiver PD2 (corresponds to the duration of passage through the light-non-blocking section on the other swing angle side $A_2$ of the light-blocking section of the second light receiver PD2).

The rest of the configuration of the projector 500 according to the fifth embodiment is the same as that in the first embodiment above.

Effect of Fifth Embodiment

In the fifth embodiment, as described above, the mirror controller 523 is configured so that when the light shield portion 27 is in a swing state in which it does not straddle the first light receiver PD1, the AC voltage applied to the mirror driver 22 is controlled based on the second period $t_{s1}$ instead of the first period $t_3$, where this second period $t_{s1}$ is the period in which the light shield portion 27 is positioned more on the other swing angle side $A_2$ of the swing angle range R than the position where it blocks the light incident on the second light receiver PD2, and so that when the light shield portion 27 is in a swing state in which it does not straddle the second light receiver PD2, the AC voltage applied to the mirror driver 22 is controlled based on a second period $t_{s2}$ instead of the first period $t_3$, where this second period $t_{s2}$ is the period in which the light shield portion 27 is positioned more on the one swing angle side $A_1$ of the swing angle range R than the position where it blocks the light incident on the first light receiver PD1. Consequently, even if the first period $t_3$ cannot be acquired, such as when where the light shield portion 27 is in a swing state in which it does not straddle the first light receiver PD1 or the second light receiver PD2, the AC voltage applied to the mirror driver 22 can continue to be controlled based on the above-mentioned second period $t_{s1}$ or $t_{s2}$ instead of the first period $t_3$.

The rest of the effect of the fifth embodiment is the same as that in the first embodiment above.

Modification Examples

The embodiments disclosed herein should be considered as illustrative in every respect and not limiting in nature. The scope of the invention being indicated by the appended claims rather than by the above description of the embodiments, all modifications (modification examples) within the meaning and range of equivalency of the claims are included.

For example, in the first to fifth embodiments, an example was given of a configuration in which the light shield portion 27 (227) had a width W2 (W22) that was less than the distance D1 between the end PD1a on the opposite side of the first light receiver PD1 from the second light receiver PD2, and the end PD2a on the opposite side of the second light receiver PD2 from the first light receiver PD1, but the present invention is not limited to this. In the present invention, the light shield portion may be configured to have a width that is greater than the distance between the end on the opposite side of the first light receiver from the second light receiver and the end on the opposite side of the second light receiver from the first light receiver.

Also, in the first to fifth embodiments, an example was given in which the mirror controller 23 (523) was configured so that when the light shield portion 27 (227) moved from the one swing angle side $A_1$ toward the other swing angle side $A_2$ of the swing angle range R, the period from when the light incident on the first light receiver PD1 started being blocked until when the light incident on the second light receiver PD2 stopped being blocked was defined as the first period $t_3$ ($t_{23}$, $t_{33}$), but the present invention is not limited to this. In the present invention, the mirror controller may be configured so that when the light shield portion moves from the other swing angle side of the swing angle range toward the one swing angle side, the period from when the light incident on the second light receiver starts being blocked until when the light incident on the first light receiver stops being blocked is defined as the first period.

In the first to fifth embodiments, an example was given in which the light shield portion 27 (227) was configured to have a thickness W2 (W22) that was less than the thickness W1 of the mirror component 21, but the present invention is not limited to this. In the present invention, the light shield portion may be configured to have a thickness that is greater than the thickness of the mirror component.

In the first to fifth embodiments, an example was given in which the optical sensor 25 was disposed between the mirror component 21 and the mirror driver 22, but the present invention is not limited to this. In the present invention, the optical sensor may be disposed somewhere other than between the mirror component and the mirror driver.

In the first to fifth embodiments, an example was given in which the optical sensor 25 (325, 425) was configured as a sensor (photo-interrupter) that determined the presence and position of an object by using the light receiver 25b (325b) to detect when the light emitted from the light emitter 25a was blocked by the object, but the present invention is not limited to this. In the present invention, the optical sensor may be configured as a sensor (photo-reflector) that determines the presence and position of an object by detecting when the light emitted from the light emitter hits the object and is reflected.

In the first to fifth embodiments, an example was given in which the mirror controller 23 (523) was configured such that the mirror component 21 was controlled to a constant deflection angle (swing angle range $\theta_a$) by PID control, but the present invention is not limited to this. In the present invention, the mirror controller may be configured to control such that the mirror component has a constant deflection angle (swing angle range) by feedback control other than PID control.

In the first to fifth embodiments, an example was given in which the mirror component 21 was configured to include the mirror substrate 21a and the mirror substrate support unit 21b, which is a part of the metal member 24, but the present invention is not limited to this. In the present invention, the mirror component may be configured not to include a mirror substrate. In this case, it is preferable to perform a surface treatment for improving the light reflectivity of the mirror substrate support portion, which is a part of the metal member.

In the first to fifth embodiments, an example was given in which the projector 100 (200, 300, 400, 500) comprised two optical scanner units 20 (220, 320, 420, 520), but the present invention is not limited to this. In the present invention, only one optical scanner unit may be provided.

In the first to fifth embodiments, an example was given in which the "optical device" of the present invention was applied to the projector 100 (200, 300, 400, 500), but the present invention is not limited to this. The "optical device" of the present invention may be applied to an "optical device" other than a projector, such as a lighting device.

[1] In view of the state of the known technology and in accordance with a first aspect of the present disclosure, an optical scanner unit includes a mirror component, a vibration generator, an optical sensor, and a light shield portion. The mirror component includes a reflective portion for reflecting light. The vibration generator is configured to swing the mirror component around a specific swing axis when AC voltage is applied. The optical sensor includes a light emitter and a light receiver for receiving light emitted from the light emitter. The light shield portion is provided to the mirror component so as to swing along with the mirror component. The light shield portion is configured to block the light emitted from the light emitter. The light receiver further includes a first light receiver that is provided on one swing angle side from a center position of a swing angle range of the light shield portion, and a second light receiver that is provided on the other swing angle side from the center position of the swing angle range.

With the optical scanner unit according to the first aspect of this disclosure, as described above, the first light receiver of the optical sensor is provided on the one swing angle side of the center position of the swing angle range of the light shield portion, and the second light receiver is provided on the other swing angle side of the center position of the swing angle range. Consequently, even if the light shield portion is shifted from the design initial position to either the one swing angle side or the other swing angle side from the center position of the swing angle range, it will be less likely that either the first light receiver or the second light receiver of the optical sensor will not be included in the swing angle range of the light shield portion (the swing angle range of the mirror component), and therefore it will be less likely that it will be impossible to detect the deflection angle of the mirror component based on the light incident on the first light receiver, or to detect the deflection angle of the mirror component based on the light incident on the second light receiver. As a result, the deflection angle of the mirror component can be accurately sensed even when the center position of the deflection angle range of the mirror component is shifted from the initial design position due to a change in the ambient temperature or the like. This effect is particularly pronounced in an optical scanner unit that is used in an environment where the change in ambient temperature is relatively large, such as an optical scanner unit installed in a vehicle.

[2] In accordance with a preferred embodiment according to the optical scanner unit mentioned above, it is preferable if the first light receiver is provided on the one swing angle side from the center position of the swing angle range and on a center position side from an end on the one swing angle side of the swing angle range, and the second light receiver is provided on the other swing angle side from the center position of the swing angle range and on a center position side from an end on the other swing angle side of the swing angle range. With this configuration, the light shield portion can be swung so as to straddle the position where the first light receiver is provided and the position where the second light receiver is provided. Therefore, even when the light shield portion is shifted from the initial design position to the one swing angle side of the swing angle range, it will be less likely that it will be impossible to detect the deflection angle of the mirror component based on the light incident on the second light receiver provided on the other swing angle side of the swing angle range. Also, even when the light shield portion is shifted from the initial design position to the other swing angle side of the swing angle range, it is less likely that it will be impossible to detect the deflection angle of the mirror component based on the light incident on the first light receiver provided on the one swing angle side of the swing angle range. As a result, even when the light shield portion is shifted from the initial design position to the one swing angle side or the other swing angle side of the swing angle range, it is less likely that it will be impossible to detect the deflection angle of the mirror component based on the light incident on the first light receiver, or to detect the deflection angle of the mirror component based on the light incident on the second light receiver.

[3] In accordance with a preferred embodiment according to any one of the optical scanner units mentioned above, it is preferable if the light shield portion has a width in a light receiver alignment direction in which the first light receiver and the second light receiver are arranged, the width of the light shield portion being less than a distance between an end of the first light receiver on an opposite side from the second light receiver and an end of the second light receiver on an opposite side from the first light receiver. With this configuration, in a state in which the light shield portion is disposed in the center position of the swing angle range, the light emitted from the light emitter can be detected by both the first light receiver and the second light receiver. As a result, in a stationary state in which the light shield portion has been stopped for assembly, maintenance, or the like of the device, the light shield portion can be easily positioned (centered) in the center position of the swing angle range by comparing the amounts of light detected by first light receiver and the second light receiver.

[4] In accordance with a preferred embodiment according to any one of the optical scanner units mentioned above, it is preferable if the width of the light shield portion is not less than a distance between the first light receiver and the second light receiver. With this configuration, in a state in which the light shield portion is disposed in the center position of the swing angle range, the light shield portion covers parts of both the first light receiver and the second light receiver, so when the light shield portion is moved to the one swing angle side or the other swing angle side of the swing angle range, the amounts of light detected by the first light receiver and the second light receiver can be changed. As a result, the amounts of light detected by the first light receiver and the second light receiver can be compared very accurately, so the light shield portion can be accurately positioned (centered) in the center position of the swing angle range during device assembly, maintenance, etc.

[5] In accordance with a preferred embodiment according to any one of the optical scanner units mentioned above, it is preferable if the width of the light shield portion is less than a distance between the first light receiver and the second light receiver. Here, in the swing state in which the light shield portion has been swung, the angle range over which the light shield portion blocks the light incident on the light receiver increases along with the width of the light shield portion, so the angle range required for the light shield portion to straddle the light receiver is larger. Therefore, with the above configuration, the width of the light shield portion is less than when the light shield portion has a width not less than the distance between the first light receiver and the second light receiver in the light receiver alignment direction, so the angle range required for the light shield portion to straddle the first light receiver and the second light receiver in a swing state in which the light shield portion has been swung can be reduced. As a result, even when the swing angle range (the magnitude of the deflection angle) is reduced, the light shield portion can be swung so as to straddle the position where the first light receiver is provided and the position where the second light receiver is provided, so even if the deflection angle of the mirror component is small, the deflection angle of the mirror component can be sensed accurately.

[6] In accordance with a preferred embodiment according to any one of the optical scanner units mentioned above, it is preferable if the optical scanner unit further includes a controller configured to perform control to swing the mirror component such that the light shield portion straddles the first light receiver and the second light receiver along a light receiver alignment direction in which the first light receiver and the second light receiver are arranged, the controller being further configured to control the AC voltage applied to the vibration generator based on a first period in which the light shield portion straddles the first light receiver and the second light receiver between the one swing angle side and the other swing angle side of the swing angle range. Here, in a sinusoidal waveform in which time and the position of the deflection angle of the light shield portion in a swing state in which the light shield portion has been swung are represented by the horizontal axis and the vertical axis, respectively, the above-mentioned first period in which the light shield portion straddles the first light receiver and the second light receiver does not include the folded portion of the sinusoidal waveform, the proportional change (angular acceleration) of the slope (the proportional change (angular velocity) in the deflection angle (vertical axis) with respect to time (horizontal axis)) is relatively small. On the other hand, the period in which the light shield portion does not block light incident on the first light receiver, and the period in which the light shield portion does not block light incident on the second light receiver, which occur respectively on the one swing angle side and the other side of the swing angle range so as to sandwich the above-mentioned first period do include the folded portion of the sinusoidal waveform, so the proportional change in the slope is relatively large. When the light shield portion is shifted from the initial design position to the one swing angle side or the other swing angle side from the center position of the swing angle range (corresponds to a swing state in which the sinusoidal waveform is offset to one side or the other side of the vertical axis with respect to the initial position of the deflection angle (vertical axis)), the length (horizontal axis) of the period during which the proportional change of the above-mentioned slope is relatively large (swing state shifted), whereas the length (horizontal axis) of the period during which the proportional change of the above-mentioned slope is relatively small undergoes a relatively small change (the effect of the above-mentioned shift is small). Therefore, with the above configuration, the AC voltage applied to the vibration generator can be controlled based on the period in which the effect of the above-mentioned shift in the sinusoidal waveform is small (first period). As a result, if the AC voltage applied to the vibration generator is controlled such that the first period becomes a previously calculated target value based on the first period in which the effect of the shift is small, then even if the above-mentioned shift occurs in the light shield portion, it will still be possible to accurately perform control for setting the size of the swing angle range (deflection angle) to the desired value.

[7] In accordance with a preferred embodiment according to any one of the optical scanner units mentioned above, it is preferable if the first period is at least one of a period from when a blockage of the light incident on the first light receiver starts until when a blockage of the light incident on the second light receiver ends in a movement of the light shield portion from the one swing angle side to the other swing angle side, and a period from when the blockage of the light incident on the second light receiver starts until when the blockage of the light incident on the first light receiver ends in a movement of the light shield portion from the other swing angle side to the one swing angle side. With this configuration, the first period is acquired based on the period from when the blockage of the light incident on the first light receiver starts until when the blockage of the light incident on the second light receiver ends in the movement of the light shield portion from the one swing angle side of the swing angle range to the other swing angle side, or the period from when the blockage of the light incident on the second light receiver starts until when the blockage of the light incident on the first light receiver ends in the movement of the light shield portion from the other swing angle side of the swing angle range to the one swing angle side, and the AC voltage applied to the vibration generator can be reliably controlled based on the period in which the above-mentioned shift is small in the sinusoidal waveform (the first period).

[8] In accordance with a preferred embodiment according to any one of the optical scanner units mentioned above, it is preferable if when the light shield portion is in a swing state in which the light shield portion does not straddle the first light receiver, the controller is configured to control the AC voltage applied to the vibration generator based on a second period, instead of the first period, that is a period during which the light shield portion is located on the other swing angle side of the swing angle range from a position where the light shield portion blocks the light incident on the second light receiver, and when the light shield portion is in a swing state in which the light shield portion does not straddle the second light receiver, the controller is configured to control the AC voltage applied to the vibration generator based on a second period, instead of the first period, that is a period during which the light shield portion is located on the one swing angle side of the swing angle range from a position where the light shield portion blocks the light incident on the first light receiver. With this configuration, even when the first period cannot be acquired, such as when the light shield portion is in a swing state in which it does not straddle the first light receiver or the second light receiver, the control of the AC voltage applied to the vibration generator can be continued based on the above-mentioned second period instead of the first period.

[9] In accordance with a preferred embodiment according to any one of the optical scanner units mentioned above, it is preferable if the controller is configured to acquire a positional deviation of the center position of the swing angle range based on a period in which the light shield portion is located on the one swing angle side of the swing angle range from a position where the light shield portion blocks the light incident on the first light receiver, and a period in which the light shield portion is located on the other swing angle side of the swing angle range from a position where the light shield portion blocks the light incident on the second light receiver. Here, if the center position of the swing angle range is shifted to the one swing angle side of the swing angle range, the period during which the light shield portion located on the one swing angle side of the range is longer than at the position where the light shield portion blocks the light incident on the first light receiver. Also, if the center position of the swing angle range is shifted to the other swing angle side of the swing angle range, the period during which the light shield portion located on the other swing angle side of the range is longer than at the position where the light shield portion blocks the light incident on the second light receiver. Therefore, with the above configuration, it can be ascertained how much the center position of the swing angle range has shifted to either the one swing angle side or the other swing angle side. As a result, a shift in the center position of the swing angle range in the optical scanner unit can be suitably controlled, such as outputting information about the shift of the center position of the swing angle range to the optical device equipped with the optical scanner unit, and thereby mechanically correcting the orientation of the optical scanner unit, for example, or adjusting the timing at which the light irradiates the mirror component of the optical scanner unit and the magnitude of the swing angle (deflection angle) by a control method using software, according to the amount of displacement of the center position of the swing angle range.

[10] In accordance with a preferred embodiment according to any one of the optical scanner units mentioned above, it is preferable if the light shield portion further includes a third light receiver that is provided between the first light receiver and the second light receiver, the third light receiver being away from each of the first light receiver and the second light receiver along a light receiver alignment direction in which the first light receiver and the second light receiver are arranged. With this configuration, even if either the first light receiver or the second light receiver is not included in the swing angle range of the light shield portion due to the fact that the center position of the deflection angle range of the mirror component has shifted from the initial position, the third light receiver and the first light receiver or the second light receiver (whichever one is included in the swing angle range) can be used to sense the deflection angle of the mirror component based on the light incident on the two light receivers.

[11] In accordance with a preferred embodiment according to any one of the optical scanner units mentioned above, it is preferable if the optical scanner unit further includes a cover member provided to cover the optical sensor. With this configuration, disturbance light such as stray light generated within the optical scanner unit (unnecessary reflected light), or light that is incident from the outside of the optical scanner unit, will be less likely to be incident on the optical sensor covered by the cover member, so it is possible to suppress any decrease in the accuracy at which the deflection angle of the mirror component is sensed based on the light incident on the light receiver, which would otherwise be due to disturbance light.

[12] In accordance with a preferred embodiment according to any one of the optical scanner units mentioned above, it is preferable if the optical scanner unit further includes a filter member provided near the light receiver such that light incident on the light receiver passes through, the filter member allowing light in a wavelength band corresponding to the light emitted by the light emitter to pass through. With this configuration, it is less likely that light with a wavelength band other than that corresponding to the light emitted by the light emitter will be incident on the light receiver in the vicinity of which the filter member is provided, so it is less likely that there will be a decrease in the accuracy at which the deflection angle of the mirror component is sensed based on the light incident on the light receiver, which would otherwise be due to disturbance light, such as stray light generated within the optical scanner unit (unnecessary reflected light), or light that is incident from the outside of the optical scanner unit.

[13] In accordance with a preferred embodiment according to any one of the optical scanner units mentioned above, it is preferable if the optical sensor is disposed between the mirror component and the vibration generator. With this configuration, if the mirror component and the vibration generator are fixed at their corners or around their outer periphery to other members such as the base member in order to stabilize the swinging of the mirror component, the optical sensor can be disposed at a position away from the positions where the mirror component and the vibration generator are fixed (at their corners or around their outer periphery), as compared to when the optical sensor is disposed on the opposite side of the mirror component from the vibration generator, or on the opposite side of the vibration generator from the mirror component, etc. As a result, it is possible to suppress the vibration of the optical sensor due to the propagation of the vibration produced by the vibration generator to the optical sensor, so it is less likely that there will be a decrease in the accuracy at which the deflection angle of the mirror component is sensed based on the light of the optical sensor that is incident on the light receiver.

[14] In accordance with a preferred embodiment according to any one of the optical scanner units mentioned above, it is preferable if the light shield portion is arranged to protrude from the mirror component to the optical sensor side along a planar direction in which a plane of the reflective portion extends, and the light shield portion has a thickness that is less than a thickness of the mirror component in a direction perpendicular to the planar direction. With this configuration, since the light shield portion has a thickness that is less than the thickness of the mirror component, the mass of the light shield portion is less likely to increase. As a result, it is possible to suppress a shift in the position of the center of gravity of the swinging portion (including the mirror component and the light shield portion), a decrease in the resonance frequency of the swinging portion, which decreases in inverse proportion to the mass of the swinging portion, or the like that is attributable to an increase in the mass of the light shield portion protruding from the mirror component toward the optical sensor.

[15] In view of the state of the known technology and in accordance with a second aspect of the present disclosure, an optical device includes any one of the optical scanner units mentioned above, and a light source unit configured to irradiate the reflective portion of the mirror component of the optical scanner unit with scanning light.

With the optical device according to the second aspect of this disclosure, as described above, in the optical scanner unit, the first light receiver of the optical sensor is provided on the one swing angle side of the center position of the swing angle range of the light shield portion, and the second light receiver of the optical sensor is provided on the other swing angle side of the center position of the swing angle range. Consequently, in the optical scanner unit, even when the light shield portion is shifted from the design initial position to the one swing angle side or the other swing angle side of the center position of the swing angle range, it will be less likely that either the first light receiver or the second light receiver of the optical sensor will not be included in the swing angle range of the light shield portion (the deflection angle range of the mirror component), so it is less like that the deflection angle of the mirror component based on the light incident on the first light receiver, or the deflection angle of the mirror component based on the light incident on the second light receiver cannot be sensed. As a result, in an optical scanner unit, even if the center position of the deflection angle range of the mirror component is shifted from the initial design position due to a change in ambient temperature or the like, the deflection angle of the mirror component can still be accurately sensed. This effect is particularly pronounced in an optical device that is used in an environment with relatively large ambient temperature changes, such as an optical device installed in a vehicle.

[16] In accordance with a preferred embodiment according to any one of the optical scanner units mentioned above, it is preferable if the light emitter of the optical sensor includes a light emitting diode, and the light receiver of the optical sensor includes a phototransistor.

[17] In accordance with a preferred embodiment according to any one of the optical scanner units mentioned above, it is preferable if the optical sensor includes a slit member that covers the light receiver, the slit member having two slits to form the first light receiver and the second light receiver, respectively.

[18] In accordance with a preferred embodiment according to any one of the optical scanner units mentioned above, it is preferable if the two slits are located spaced apart from each other in a light receiver alignment direction in which the first light receiver and the second light receiver are arranged.

[19] In accordance with a preferred embodiment according to any one of the optical scanner units mentioned above, it is preferable if the mirror component includes a mirror substrate and a mirror substrate support unit that supports the mirror substrate.

[20] In accordance with a preferred embodiment according to any one of the optical scanner units mentioned above, it is preferable if the light shield portion is integrated to the mirror substrate support unit as a one-piece, unitary member.

As described above, the present disclosure provides an optical scanner unit and an optical device with which the deflection angle of a mirror component can be accurately sensed even when the center position of the deflection angle range of the mirror component is shifted from the initial design position due to a change in ambient temperature or the like.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An optical scanner unit comprising:
   a mirror component including a reflective portion for reflecting light;
   a vibration generator that swings the mirror component around a specific swing axis when AC voltage is applied;
   an optical sensor including a light emitter and a light receiver for receiving light emitted from the light emitter; and
   a light shield portion provided to the mirror component so as to swing along with the mirror component, the light shield portion blocking the light emitted from the light emitter,
   the light receiver further including
      a first light receiver that is provided on one swing angle side from a center position of a swing angle range of the light shield portion and is provided on a center position side from an end on the one swing angle side of the swing angle range such that the light shield portion does not overlap with the first light receiver while the light shield portion is located at the end on the one swing angle side of the swing angle range, and
      a second light receiver that is provided on the other swing angle side from the center position of the swing angle range and is provided on a center position side from an end on the other swing angle side of the swing angle range such that the light shield portion does not overlap with the second light receiver while the light shield portion is located at the end on the other swing angle side of the swing angle range.

2. The optical scanner unit according to claim 1, wherein the light shield portion has a width in a light receiver alignment direction in which the first light receiver and the second light receiver are arranged, the width of the light shield portion being less than a distance between an end of the first light receiver on an opposite side from the second light receiver and an end of the second light receiver on an opposite side from the first light receiver.

3. The optical scanner unit according to claim 2, wherein the width of the light shield portion is not less than a distance between the first light receiver and the second light receiver.

4. The optical scanner unit according to claim 2, wherein the width of the light shield portion is less than a distance between the first light receiver and the second light receiver.

5. The optical scanner unit according to claim 1, further comprising
   a controller that performs control to swing the mirror component such that the light shield portion straddles the first light receiver and the second light receiver along a light receiver alignment direction in which the first light receiver and the second light receiver are arranged, the controller further controlling the AC voltage applied to the vibration generator based on a first period in which the light shield portion straddles the first light receiver and the second light receiver between the one swing angle side and the other swing angle side of the swing angle range.

6. The optical scanner unit according to claim 5, wherein the first period is at least one of a period from when a blockage of the light incident on the first light receiver starts until when a blockage of the light incident on the second light receiver ends in a movement of the light shield portion from the one swing angle side to the other swing angle side, and a period from when the blockage of the light incident on the second light receiver starts until when the blockage of the light incident on the first light receiver ends in a movement of the light shield portion from the other swing angle side to the one swing angle side.

7. The optical scanner unit according to claim 5, wherein when the light shield portion is in a swing state in which the light shield portion does not straddle the first light receiver, the controller controls the AC voltage applied to the vibration generator based on a second period, instead of the first period, that is a period during which the light shield portion is located on the other swing angle side of the swing angle range from a position where the light shield portion blocks the light incident on the second light receiver, and
when the light shield portion is in a swing state in which the light shield portion does not straddle the second light receiver, the controller controls the AC voltage applied to the vibration generator based on a second period, instead of the first period, that is a period during which the light shield portion is located on the one swing angle side of the swing angle range from a position where the light shield portion blocks the light incident on the first light receiver.

8. The optical scanner unit according to claim 5, wherein the controller acquires a positional deviation of the center position of the swing angle range based on a period in which the light shield portion is located on the one swing angle side of the swing angle range from a position where the light shield portion blocks the light incident on the first light receiver, and a period in which the light shield portion is located on the other swing angle side of the swing angle range from a position where the light shield portion blocks the light incident on the second light receiver.

9. The optical scanner unit according to claim 1, wherein the light shield portion further includes a third light receiver that is provided between the first light receiver and the second light receiver, the third light receiver being away from each of the first light receiver and the second light receiver along a light receiver alignment direction in which the first light receiver and the second light receiver are arranged.

10. The optical scanner unit according to claim 1, further comprising
a cover member provided to cover the optical sensor.

11. The optical scanner unit according to claim 1, further comprising
a filter member provided near the light receiver such that light incident on the light receiver passes through, the filter member allowing light in a wavelength band corresponding to the light emitted by the light emitter to pass through.

12. The optical scanner unit according to claim 1, wherein the optical sensor is disposed between the mirror component and the vibration generator.

13. The optical scanner unit according to claim 1, wherein the light shield portion is arranged to protrude from the mirror component to the optical sensor side along a planar direction in which a plane of the reflective portion extends, and
the light shield portion has a thickness that is less than a thickness of the mirror component in a direction perpendicular to the planar direction.

14. An optical device comprising:
the optical scanner unit according to claim 1; and
a light source unit that irradiates the reflective portion of the mirror component of the optical scanner unit with scanning light.

15. The optical scanner unit according to claim 1, wherein the light emitter of the optical sensor includes a light emitting diode, and
the light receiver of the optical sensor includes a phototransistor.

16. The optical scanner unit according to claim 1, wherein the optical sensor includes a slit member that covers the light receiver, the slit member having two slits to form the first light receiver and the second light receiver, respectively.

17. The optical scanner unit according to claim 16, wherein
the two slits are located spaced apart from each other in a light receiver alignment direction in which the first light receiver and the second light receiver are arranged.

18. The optical scanner unit according to claim 1, wherein the mirror component includes a mirror substrate and a mirror substrate support unit that supports the mirror substrate.

19. The optical scanner unit according to claim 18, wherein
the light shield portion is integrated to the mirror substrate support unit as a one-piece, unitary member.

* * * * *